United States Patent
Yamanaka et al.

(10) Patent No.: US 7,270,416 B2
(45) Date of Patent: Sep. 18, 2007

(54) LIGHT MODULATING UNIT AND IMAGE PROJECTION APPARATUS

(75) Inventors: Kazuya Yamanaka, Hachioji (JP); Hiroyoshi Kobayashi, Hachioji (JP); Susumu Kobayashi, Sayama (JP)

(73) Assignee: Olympus Corporation, Tokyo (JP)

( * ) Notice: Subject to any disclaimer, the term of this patent is extended or adjusted under 35 U.S.C. 154(b) by 283 days.

(21) Appl. No.: 11/053,517

(22) Filed: Feb. 8, 2005

(65) Prior Publication Data
US 2005/0185139 A1  Aug. 25, 2005

(30) Foreign Application Priority Data
Feb. 25, 2004 (JP) .............. 2004-050213

(51) Int. Cl.
G03B 21/00 (2006.01)
G03B 21/14 (2006.01)
(52) U.S. Cl. .......................... 353/20; 353/31
(58) Field of Classification Search .......... 353/20, 353/31
See application file for complete search history.

(56) References Cited

U.S. PATENT DOCUMENTS 6,972,809 B2* 12/2005 Nakanishi ............... 349/5
7,021,766 B2* 4/2006 Uehara ................... 353/20

FOREIGN PATENT DOCUMENTS

| JP | 7-52262 | 6/1995 |
| JP | 10-304284 | 11/1998 |
| JP | 2002-268014 | 9/2002 |

\* cited by examiner

*Primary Examiner*—Christopher Mahoney
(74) *Attorney, Agent, or Firm*—Volpe & Koenig PC

(57) ABSTRACT

A light modulating unit includes first and second light modulating sections each of which modulates an illumination light on the basis of a video signal to generate a projection light that is a linearly polarized light, a light path synthesizing section which synthesizes the projection lights generated by the first and second light modulating sections using the nature that directions of polarizations of the projection lights cross at right angles, and a beam shifting section which sets beams of the projection lights synthesized by the light path synthesizing section, in a shifted state or a non-shifted state on the basis of the directions of polarizations of the projection lights, the beam shifting section switching the shifted state and the non-shifted state synchronously with modulation timings for the first and second light modulating sections.

21 Claims, 15 Drawing Sheets

F I G. 3 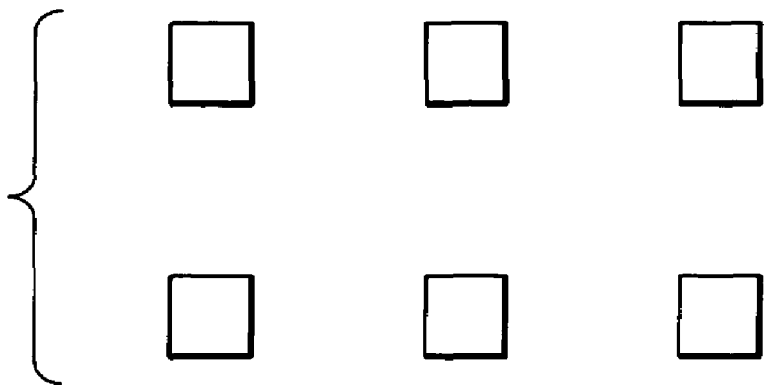
F I G. 4 

|  | First frame | | Second frame | |
| --- | --- | --- | --- | --- |
|  | First field | Second field | First field | Second field |
| First light modulating device | Pixel position : a (L image) | Pixel position : b (R image) | Pixel position : a (L image) | Pixel position : b (R image) |
| Second light modulating device | Pixel position : d' (R image) | Pixel position : c' (L image) | Pixel position : d' (R image) | Pixel position : c' (L image) |

LIGHT MODULATING UNIT AND IMAGE PROJECTION APPARATUS

CROSS-REFERENCE TO RELATED APPLICATIONS

This application is based upon and claims the benefit of priority from prior Japanese Patent Application No. 2004-050213, filed Feb. 25, 2004, the entire contents of which are incorporated herein by reference.

BACKGROUND OF THE INVENTION

1. Field of the Invention

The present invention relates to a light modulating unit and an image projection apparatus using the light modulating unit.

2. Description of the Related Art

With the recent increase in the resolution of imaging devices, there has also been a growing demand for an increase in the resolution of image projection apparatuses that display images taken. Accordingly, much effort has been made to develop display devices (light modulating devices) with a large number of pixels. However, the display device does not have a sufficient resolution compared to the imaging device. The light modulating device is sometimes called a spatial modulation device.

A proposal described below has been made as a technique to realize a high resolution using a light modulating device (LCD or the like) with a limited number of pixels.

Jpn. Pat. Appln. KOKAI Publication No. 10-304284 and Jpn. Pat. Appln. KOKOKU Publication No. 7-52262 propose a technique to realize a high resolution using two light modulating devices (LCDs) and a polarization beam splitter (PBS). The two light modulating devices are arranged so that their images are offset from each other by half a pixel pitch. The light modulating devices are also configured so that their directions of polarization cross at right angles. The resolution is increased by using the PBS to synthesize a P-polarized light image and an S-polarized light image generated by the two light modulating devices.

However, this proposal simply synthesizes the images generated by the two light modulating devices, using the PBS. Because of its nature, the PBS can synthesize only two images, a P-polarized light image and an S-polarized light image. This technique can thus realize only two-point pixel shifts. That is, this proposal cannot realize three-or-more-point pixel shifts. Therefore, with this proposal, it is difficult to sufficiently increase the resolution.

Jpn. Pat. Appln. KOKAI Publication No. 2002-268014 proposes that a two- or four-point pixel shift be realized by using one light modulating device and supplying an image from the light modulating device to a beam shifting section (wobbling unit) through a PBS. However, if a four-point pixel shift is carried out, four points are temporally sequentially shifted, so that a light intensity per pixel is one-fourth of a normal value. It is thus difficult obtain a sufficient light intensity. Further, since the four points are temporally sequentially shifted, a time lag may occur, resulting in a flickering image.

Thus, disadvantageously, with the conventionally proposed techniques to increase the resolution, it is difficult to sufficiently increase the resolution, to obtain a sufficient light intensity, and to obtain images free from flickering. Accordingly, it has been difficult to increase the resolution and to obtain images with an excellent display quality.

It is an object of the present invention to provide a light modulating unit and an image projection apparatus that enable the resolution and display quality to be improved.

BRIEF SUMMARY OF THE INVENTION

A first aspect of the present invention, there is provided a light modulating unit which modulates an illumination light on the basis of an inputted video signal, the light modulating unit comprising: first and second light modulating sections each of which modulates an illumination light on the basis of a video signal to generate a projection light that is a linearly polarized light; a light path synthesizing section which synthesizes the projection lights generated by the first and second light modulating sections using the nature that directions of polarizations of the projection lights cross at right angles; and a beam shifting section which sets beams of the projection lights synthesized by the light path synthesizing section, in a shifted state or a non-shifted state on the basis of the directions of polarizations of the projection lights, the beam shifting section switching the shifted state and the non-shifted state synchronously with modulation timings for the first and second light modulating sections.

In the light modulating unit, a positional relationship between the first and second light modulating sections may be determined so that pixel positions of the projection lights generated by the first and second light modulating sections and synthesized by the light path synthesizing section are adjacent to each other in a predetermined direction.

In the light modulating unit, the beam shifting section may include a liquid crystal panel which can rotate the direction of polarization of the projection light and a birefringence plate which generates a transmission light which is offset from an extension of an incident light if the incident light has a particular direction of polarization, and the liquid crystal panel may rotate the direction of polarization of the projection light synchronously with the modulation timings for the first and second light modulating sections.

In the light modulating unit, the light modulating unit may comprise a plurality of sets each composed of the first and second light modulating sections and the light path synthesizing section, the first and second light modulating sections in each set generating projection lights of the same color, colors of the projection lights being different between the sets, and the light modulating unit may further comprise a color synthesizing prism which synthesizes the projection lights from the respective sets, and the beam shifting section may shift the beams of the projection lights synthesized by the color synthesizing prism on the basis of the directions of polarizations of the projection lights.

In the light modulating unit, the number of sets may be three and the colors of the projection lights in the respective sets may be red, blue, and green.

In the light modulating unit, the light path synthesizing section may be composed of a polarization beam splitter having a first to sixth planes and a polarization plane, and the first and second light modulating sections may be composed of first and second light modulating devices, respectively, arranged opposite the first and second planes that are not perpendicular to the polarization plane of the polarization beam splitter, and when the illumination light is incident on the third plane which is not perpendicular to the polarization plane and which is different from the first and second planes, the first light modulating device may be illuminated by an S-polarized light component of the illumination light reflected by the polarization plane, and the second light modulating device may be illuminated by a P-polarized light component of the illumination light passing through the polarization plane.

In the light modulating unit, each of the first and second light modulating sections may include a plurality of light modulating devices which generate projection lights having different colors and a color synthesizing prism which synthesizes the projection lights generated by the plurality of light modulating devices, and the direction of polarization of the projection light emitted by the color synthesizing prism of the first light modulating section may be orthogonal to the direction of polarization of the projection light emitted by the color synthesizing prism of the second light modulating section.

In the light modulating unit, one of the first and second light modulating sections may have a λ/2 plate which makes the direction of polarization of the projection light emitted by the first light modulating section orthogonal to the direction of polarization of the projection light emitted by the second light modulating section.

In the light modulating unit, the light path synthesizing section may be composed of a polarization beam splitter, and a projection light of a P-polarized light and a projection light of an S-polarized light may be incident on the beam shifting section.

In the light modulating unit, if an amount of input image information contained in the video signal is larger than an amount of display image information which can be displayed by each of the first and second light modulating sections, the liquid crystal panel may sequentially assume two states in which the liquid crystal panel rotates or does not rotate the direction of polarization of the projection light through 90°, and if the amount of input image information is smaller than the amount of display image information, the liquid crystal panel may maintain one state in which the liquid crystal panel rotates the direction of polarization of the projection light through 45°.

In the light modulating unit, if an amount of input image information contained in the video signal is larger than an amount of display image information which can be displayed by each of the first and second light modulating sections, the beam shifting section may sequentially set the projection lights generated by the first and second light modulating sections, in the shifted state and the non-shifted state in a direction orthogonal to the predetermined direction, and if the amount of input image information is smaller than the amount of display image information, the beam shifting section may apply a spatial low pass filter action to the projection lights generated by the first and second light modulating sections, in the direction orthogonal to the predetermined direction.

A second aspect of the present invention, there is provided an image projection apparatus comprising: the light modulating unit, a light source which supplies an illumination light to the first and second light modulating sections, and a projection optical section which projects the projection light from the beam shifting section on a screen.

In the image projection apparatus, the positional relationship between the first and second light modulating sections may be determined so that a pixel position of the projection light generated by the first light modulating section and synthesized by the light path synthesizing section is offset from a pixel position of the projection light generated by the second light modulating section and synthesized by the light path synthesizing section by half a pixel pitch in a predetermined direction, and the beam shifting section may be configured so that a pixel position of the projection light in the shifted state is offset from a pixel position of the projection light in the non-shifted state by half a pixel pitch in a direction orthogonal to the predetermined direction.

In the image projection apparatus, the light path synthesizing section may be composed of a polarization beam splitter, and one of beams of the projection lights generated by the first and second light modulating sections may be shifted by the beam shifting section, and the other beam may not be shifted by the beam shifting section.

In the image projection apparatus, the image projection apparatus may further comprise an extracting section which extracts, from the video signal, a signal corresponding to a projection light for each pixel emitted by the beam shifting section, and the first and second light modulating sections may modulate the illumination light on the basis of the signal extracted by the extracting section.

A third aspect of the present invention, there is provided an image projection apparatus which uses the light modulating unit to project images based on right and left eye video signals on a screen in order to allow a three-dimensional image to be observed using a pair of polarization glasses in which a direction of polarization for a right eye and a direction of polarization for a left eye cross at right angles, wherein if one of the first and second light modulating sections modulates an illumination light on the basis of the right eye video signal, the other of the first and second light modulating sections modulates the illumination light on the basis of the left eye video signal, the positional relationship between the first and second light modulating sections is determined so that a pixel position of the projection light generated by the first light modulating section and synthesized by the light path synthesizing section is offset from a pixel position of the projection light generated by the second light modulating section and synthesized by the light path synthesizing section by half a pixel pitch in a predetermined direction, and the beam shifting section is configured so that a pixel position of the projection light in the shifted state is offset from a pixel position of the projection light in the non-shifted state by half a pixel pitch in a direction orthogonal to the predetermined direction.

In the image projection apparatus, the image projection apparatus may further comprise an extracting section which extracts, from the video signal, a signal corresponding to a projection light for each pixel emitted by the beam shifting section, and the first and second light modulating sections may modulate the illumination light on the basis of the signal extracted by the extracting section.

A fourth aspect of the present invention, there is provided a light modulating unit which modulates an illumination light on the basis of an inputted video signal, the light modulating unit comprising: at least one light modulating section which modulates an illumination light on the basis of a video signal to generate a projection light that is a linearly polarized light; and a beam shifting section which sets a beam of the projection light generated by the light modulating section, in a shifted state or a non-shifted state on the basis of a direction of polarization of the projection light, the beam shifting section switching the shifted state and the non-shifted state synchronously with a modulation timing for the light modulating section, wherein if an amount of input image information contained in the video signal is larger than an amount of display image information which can be displayed by the light modulating section, the beam shifting section sequentially sets the beam of the projection light in the shifted state and the non-shifted state, and if the amount of input image information is smaller than the amount of display image information, the beam shifting section does not sequentially set the beam of the projection light in the shifted state and the non-shifted state but fixes the beam in one state.

In the light modulating unit, the beam shifting section may include a liquid crystal panel which can rotate the direction of polarization of the projection light and a birefringence plate which generates a transmission light which is offset from an extension of an incident light if the incident light has a particular direction of polarization, and if the amount of input image information is larger than the amount of display image information, the liquid crystal panel may sequentially assume two states in which the liquid crystal panel rotates or does not rotate the direction of polarization of the projection light through 90°, and if the amount of input image information is smaller than the amount of display image information, the liquid crystal panel may maintain one state in which the liquid crystal panel rotates the direction of polarization of the projection light through 45°. Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a diagram showing an array of pixels in the light modulating device according to the first embodiment of the present invention;

FIG. 4 is a diagram showing an array of pixels of the light modulating devices on a projection plane after projection lights have been synthesized by a light path synthesizing section;

FIG. 16 is a diagram showing an array of pixels of light modulating devices on a projection plane after projection lights have been synthesized by a light path synthesizing section, according to an eighth embodiment of the present invention;

FIG. 20 is a table illustrating the temporal flow of a display state according to the eighth embodiment of the present invention.

DETAILED DESCRIPTION OF THE INVENTION

Embodiments of the present invention will be described below with reference to the drawings.

EMBODIMENT 1

Figure 1:
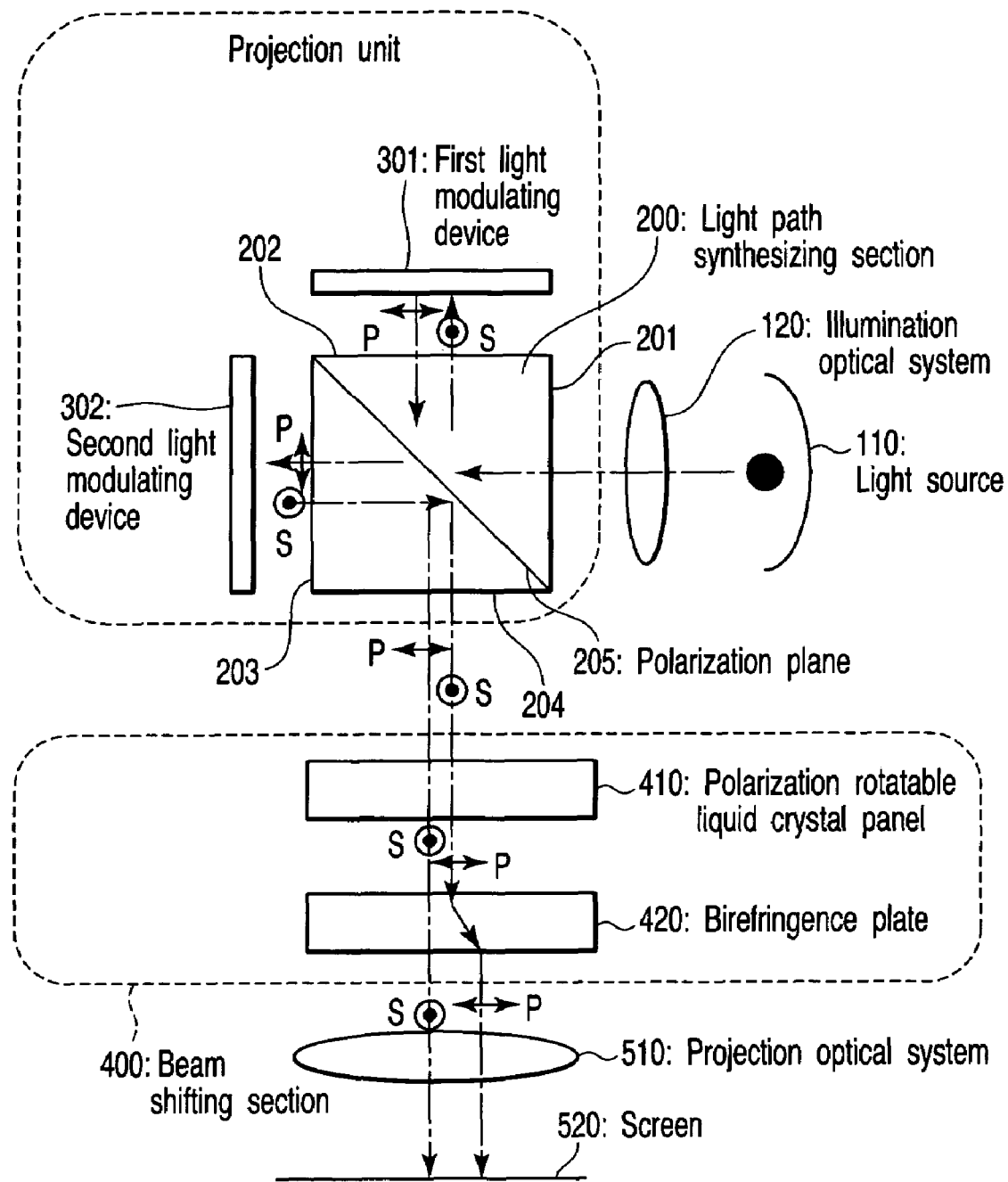
FIG. 1 is a view schematically showing an image projection apparatus using a light modulating unit according to a first embodiment of the present invention.

FIG. 1 is a view schematically showing an image projection apparatus using a light modulating unit according to a first embodiment of the present invention.

A light source 110 is a very high pressure mercury lamp, a xenon lamp, an LED, or the like. An illumination light from the light source 110 is incident, via an illumination optical system 120, on a projection unit composed of a light path synthesizing section 200, a first light modulating device 301, and a second light modulating device 302.

The light path synthesizing section 200 has a polarization converting function and a light path synthesizing function. The light path synthesizing section 200 is a PBS (Polarization Beam Splitter) prism. The PBS prism is a hexahedron structure. When an illumination light is incident on a polarization plane 205 through a constituent plane 201 of the PBS prism, a P-polarized light component of the illumination light is transmitted through the polarization plane 205. On the other hand, an S-polarized light component of the illumination light is reflected by the polarization plane 205.

The S-polarized light component separated by the light path synthesizing section 200 is emitted from a constituent plane 202 of the PBS prism. The S-polarized light component is then incident on a first light modulating device 301 placed opposite the constituent plane 202. The P-polarized light component separated by the light path synthesizing section 200 is emitted from a constituent plane 203 of the PBS prism. The P-polarized light component is then incident on a second light modulating device 302 placed opposite the constituent plane 203.

Each of the first light modulating device 301 and second light modulating device 302 is composed of a reflection type liquid crystal display device (reflection type LCD) and spatially modulate the incident light in accordance with a video signal to generate a projection light that is a linearly polarized light. Specifically, the light modulating device 301 rotates the incident S-polarized light component in accordance with the video signal. The light modulating device 301 thus emits a P-polarized light component to the constituent plane 202 of the PBS prism. The light modulating device 302 rotates the incident P-polarized light component in accordance with the video signal. The light modulating device 302 thus emits an S-polarized light component to the constituent plane 203 of the PBS prism. The P-polarized light component from the light modulating device 301 is transmitted through the polarization plane 205 of the PBS prism 200. The P-polarized light component is then emitted from a constituent plane 204 of the prism 200. The S-polarized light component from the light modulating device 302 is reflected by the polarization plane 205 of the PBS prism 200. The S-polarized light component is then emitted from the constituent plane 204 of the prism 200. In other words, the light path synthesizing section 200 synthesizes the P-polarized light from the light modulating device 301 and the S-polarized light from the light modulating device 302 using the nature that their directions of polarization cross at right angles. In this case, a wavelength plate may be placed between the light path synthesizing section (PBS prism) and the light modulating device (reflection type LCD).

Figure 2B:
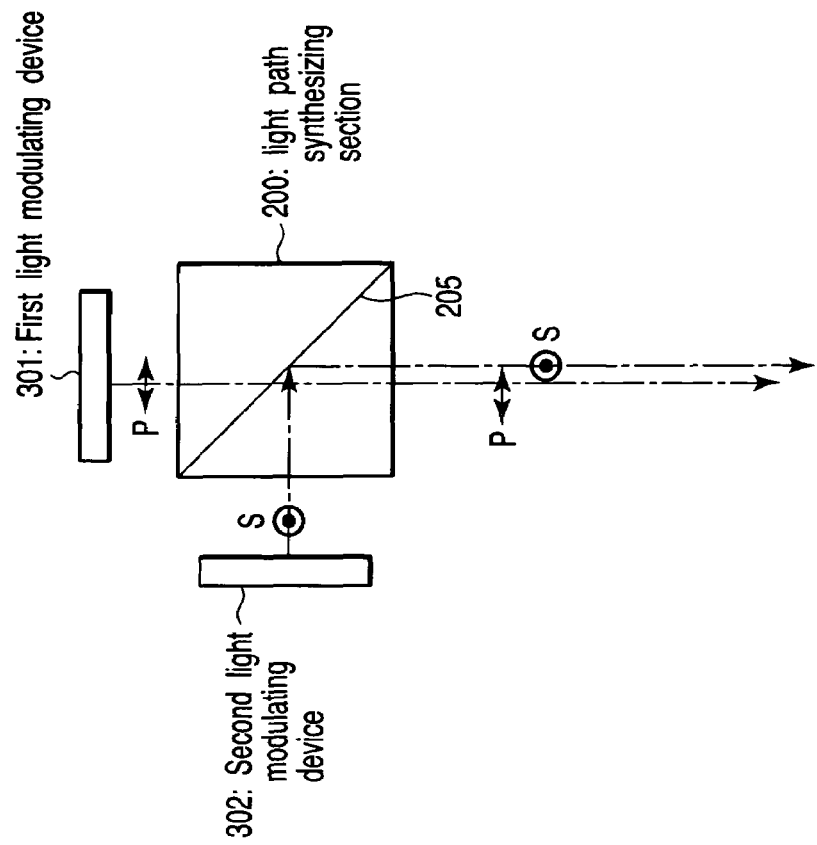
FIGS. 2A and 2B are diagrams schematically showing the positional relationship between light modulating devices according to the first embodiment of the present invention.
Figure 2A:
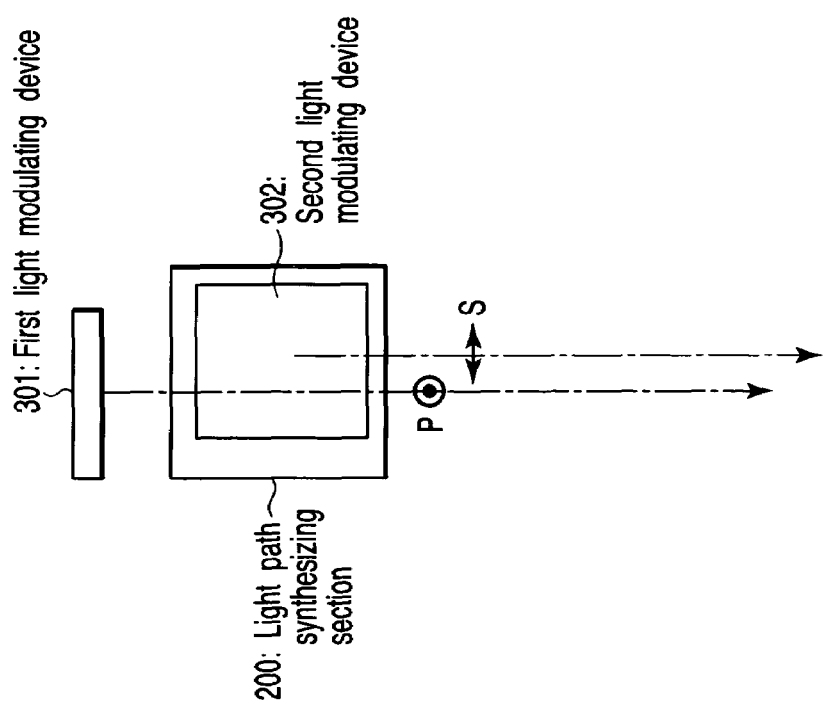

FIGS. 2A and 2B are diagrams showing the positional relationship between the first light modulating device 301 and the second light modulating device 302. FIG. 2A is a plan view and FIG. 2B is a side view. FIG. 3 is a diagram showing an array of pixels in each of the first light modulating device 301 and second light modulating device 302. FIG. 4 is a diagram showing an array of pixels on the projection plane (screen plane), of both first light modulating device 301 and second light modulating device 302, after projection lights have been synthesized by the light path synthesizing section 200. That is, FIG. 4 shows the array of pixels on the projection plane (screen plane) obtained given that a beam shifting section 400 is not provided.

In FIG. 3 and subsequent figures illustrating the array of pixels, the open area ratio of each pixel is reduced so that the pixels do not overlap one another. However, the open area ratio of each pixel may be increased so that, for example, in FIG. 4, pixels of the first LCD overlap pixels of the second LCD.

As shown in FIG. 2A, the first light modulating device 301 and the second light modulating device 302 are arranged offset from each other by half a pixel pitch in a horizontal direction. As shown in FIG. 4, the positional relationship between the first light modulating device 301 (first LCD) and the second light modulating device 302 (second LCD) is determined so that the projected pixels of the first light modulating device 301 is adjacent to the respective projected pixels of the second light modulating device 302 in the horizontal direction.

Projection lights (video image lights) synthesized by the light path synthesizing section 200 are incident on the beam shifting section 400. The beam shifting section 400 is composed of a polarization rotatable liquid crystal panel 410 that can rotate a polarized light and a birefringence plate 420.

The liquid crystal panel 410 is composed of a TN type liquid crystal panel. Rotation of the polarized light can be controlled by turning on and off voltage applied to the liquid crystal panel 410. Specifically, if the voltage applied to the liquid crystal, panel 410 is off, the P-polarized light is rotated to become an S-polarized light. The S-polarized light is rotated to become a P-polarized light. If the voltage applied to the liquid crystal panel 410 is on, the P-polarized light passes through the liquid crystal panel 410 as it is without being rotated. Likewise, the S-polarized light passes through the liquid crystal panel 410 as it is without being rotated.

The birefringence plate 420 is a colorless transparent crystal plate having birefringence and may be a quartz plate, a lithium niobate plate, or the like. The birefringence plate 420 is configured so that its crystal axis normally lies at 45° with an incident plane. The birefringence plate 420 separates an incident light into an ordinary light (no) and an extraordinary light (ne) depending on the direction of polarization of the incident light. In the present embodiment, as shown in FIG. 1, the beam of the S-polarized light passes through the birefringence plate 420 without being shifted by the birefringence plate 420. The beam of the P-polarized light is shifted by the birefringence plate 420. The shift amount is half a pixel pitch as described later. The shift amount can be determined depending on the material and thickness of the birefringence plate 420.

Figure 5A:
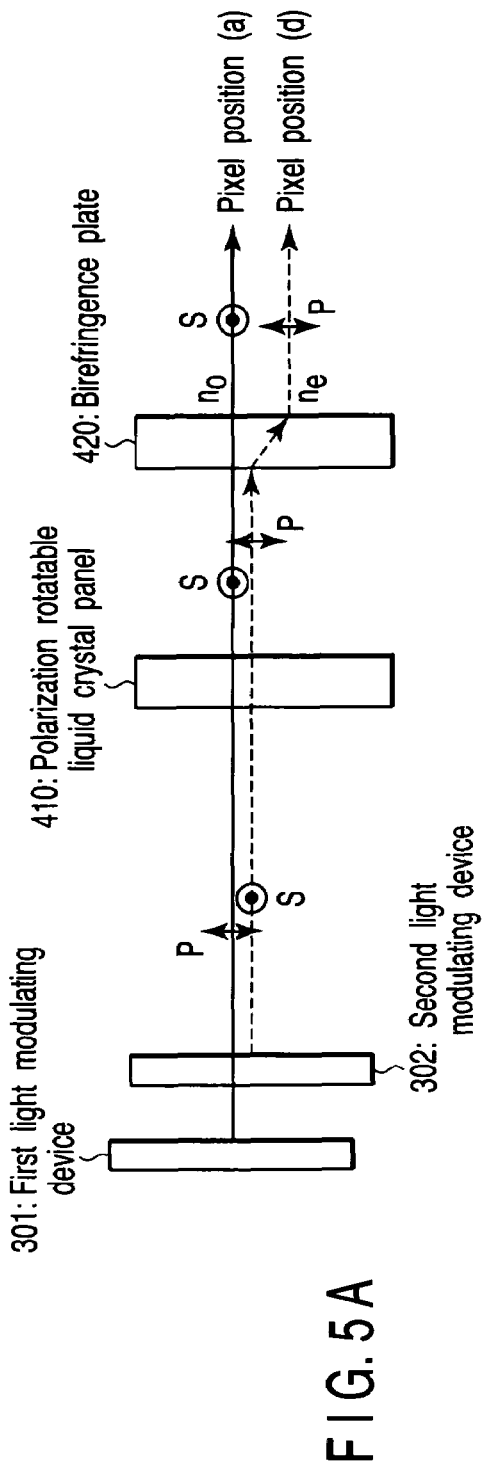
FIGS. 5A and 5B are diagrams illustrating the action of a beam shifting section according to the first embodiment of the present invention.
Figure 5B:
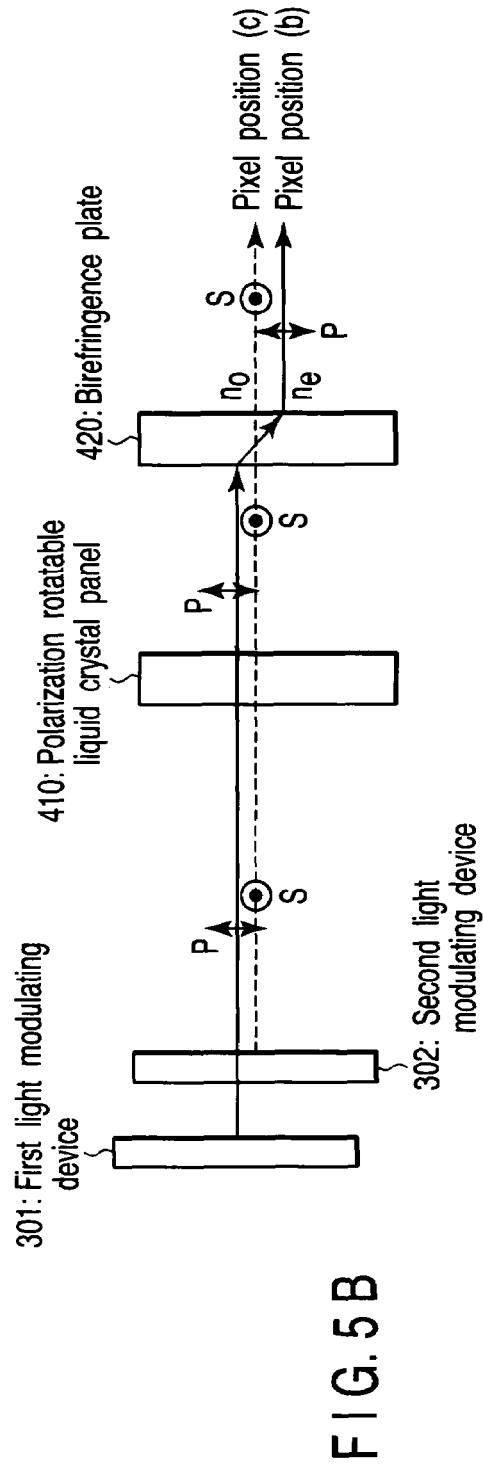

FIGS. 5A and 5B are diagrams illustrating the action of the beam shifting section 400. FIG. 5A shows the case where the voltage applied to the liquid crystal panel 410 is off. FIG. 5B shows the case where the voltage applied to the liquid crystal panel 410 is on. In FIGS. 5A and 5B, for convenience, the first light modulating device 301 and the second light modulating device 302 are drawn so as to be offset from each other in a vertical direction. Thus, beams from the first light modulating device 301 and second light modulating device 302 are drawn so as to be offset from each other in a vertical direction. However, the first light modulating device 301 and the second light modulating device 302 have an optically conjugate positional relationship. For example, the length of the optical path from the first light modulating device 301 to the polarization rotatable liquid crystal panel 410 is equal to that from the second light modulating device 302 to the polarization rotatable liquid crystal panel 410. Furthermore, for convenience, the light path synthesizing section 200 is not shown.

Figure 6A:
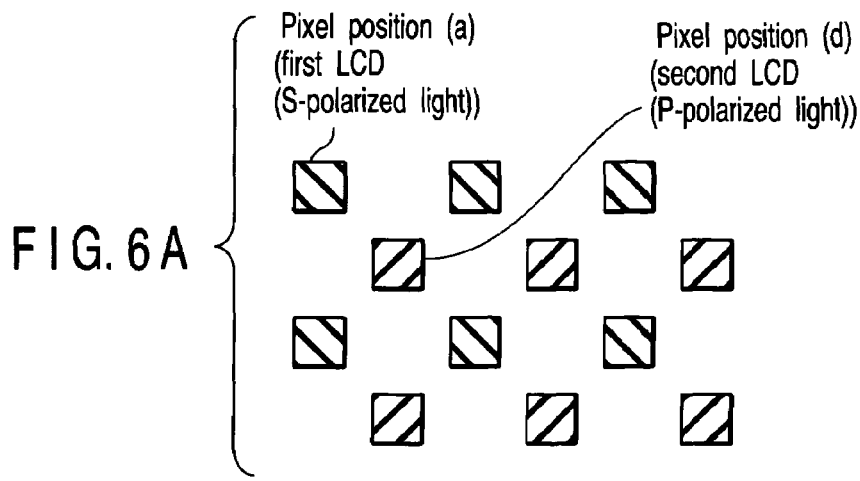
FIGS. 6A and 6B are diagrams showing an array of pixels of the light modulating devices on the projection plane after projection lights have passed through the beam shifting section, according to the first embodiment of the present invention.
Figure 6B:
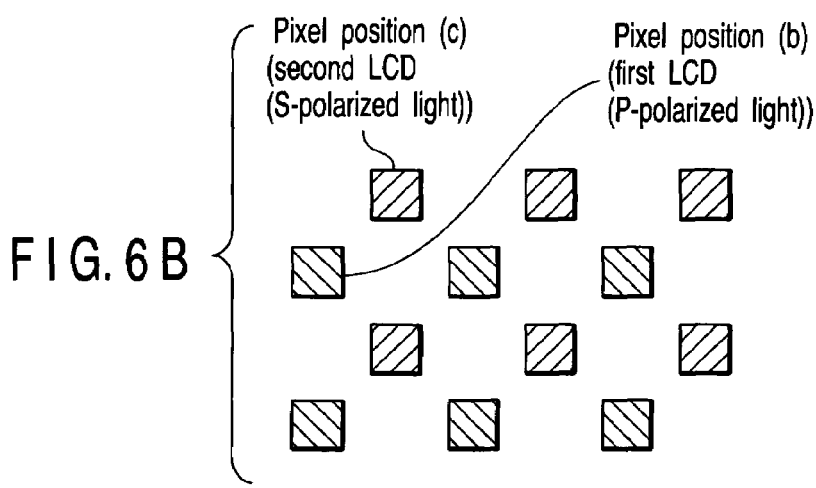

FIGS. 6A and 6B are diagrams showing an array of pixels on the projection plane (screen plane), of the first light modulating device (first LCD) 301 and second light modulating device (second LCD) 302, after projection lights have passed through the beam shifting section 400. FIG. 6A shows the case where the voltage applied to the liquid crystal panel 410 is off. FIG. 6B shows the case where the voltage applied to the liquid crystal panel 410 is on.

As shown in FIG. 5A, if the liquid crystal panel 410 is off, the P-polarized light from the first light modulating device 301 is rotated by the liquid crystal panel 410 to become an S-polarized light. The S-polarized light from the liquid crystal panel 410 passes through the birefringence plate 420 without being shifted. The S-polarized light from the second light modulating device 302 is rotated by the liquid crystal panel 410 to become a P-polarized light. The P-polarized light from the liquid crystal panel 410 is shifted in a vertical direction by the birefringence plate 420. Accordingly, if the liquid crystal panel is off, then as shown in FIG. 6A, the pixel positions of the projection lights from the first light modulating device 301 are maintained. On the other hand, the pixel positions of the projection lights from the second light modulating device 302 are shifted by half a pixel pitch in the vertical direction. As a result, the pixel position (a) of the projection light from the first light modulating device 301 are offset from the pixel position (d) of the projection light from the second light modulating device 302, by half a pixel pitch in both horizontal and vertical directions on the projection plane (screen plane), as shown in FIG. 6A.

As shown in 5B, if the liquid crystal panel 410 is on, the P-polarized light from the first light modulating device 301 passes through the liquid crystal panel 410 without being rotated by the liquid crystal panel 410. The P-polarized light is then shifted in the vertical direction by the birefringence plate 420.

The S-polarized light from the second light modulating device 302 passes through the liquid crystal panel 410 without being rotated by the liquid crystal panel 410 and then passes through the birefringence plate 420 without being shifted by the birefringence plate 420. Consequently, if the liquid crystal panel 410 is on, then as shown in FIG. 6B, the pixel positions of the projection lights from the first light modulating device 301 are shifted by half a pixel pitch in the vertical direction. On the other hand, the pixel positions of the projection lights from the second light modulating device 302 are maintained. As a result, the pixel position (b) of the projection light from the first light modulating device 301 are offset from the pixel position (c) of the projection light from the second light modulating device 302, by half a pixel pitch in both horizontal and vertical directions on the projection plane (screen plane), as shown in FIG. 6B.

As is apparent from the above description, by turning on and off the liquid crystal panel 410, it is possible to determine whether or not to shift the light incident on the beam shifting section 400 depending on the direction of polarization of the incident light. Accordingly, by temporally turning on and off the liquid crystal panel 410 synchronously with modulation timings for the first light modulating device 301 and second light modulating device 302, it is possible to synthesize the display state shown in FIG. 6A and the display state shown in FIG. 6B in the direction of a time axis. As a result, a display state such as the one shown in FIG. 7 can be realized by projecting an image on a screen 520 via a projection optical system 510. Specifically, the pixels are shifted in the horizontal direction by a projection unit composed of the light path synthesizing section 200, the first light modulating device 301, and the second light modulating device 302. The pixels are further shifted in the vertical direction by the beam shifting section 400. It is therefore possible to realize the display state of a four-point pixel shift such as the one shown in FIG. 7.

Figure 7:
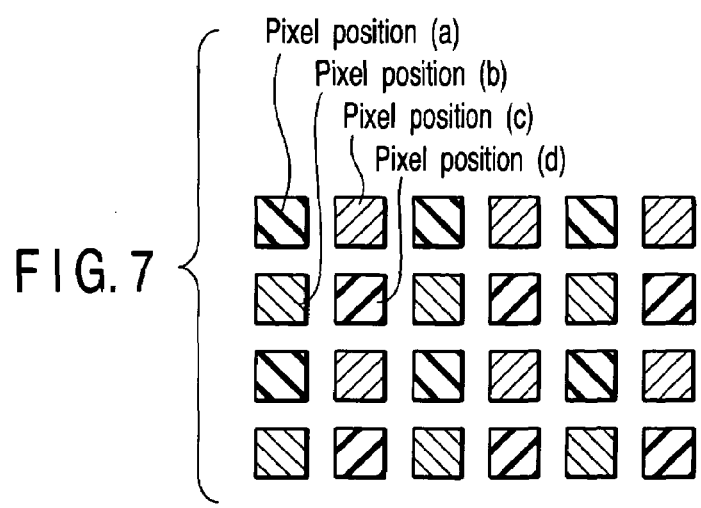
FIG. 7 is a diagram showing the array of pixels of the light modulating devices on the projection plane after the projection lights have passed through the beam shifting section, according to the first embodiment of the present invention.
Figure 8:
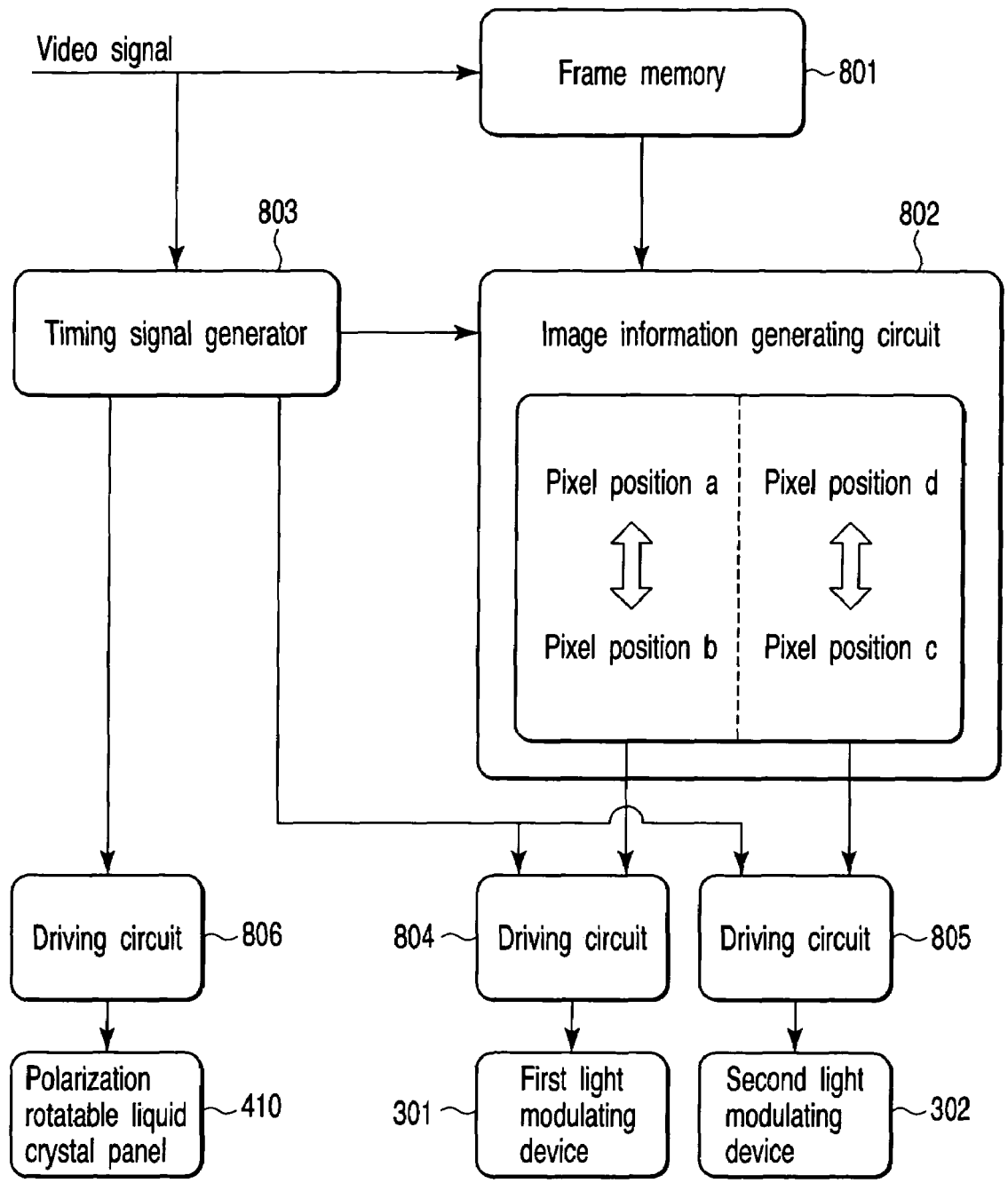
FIG. 8 is a block diagram showing the electrical configuration of the image projection apparatus according to the first embodiment of the present invention.

FIG. 8 is a block diagram showing a configuration for realizing a display of a four-point pixel shift such as the one shown in FIG. 7.

An input video signal is stored in a frame memory 801. An image information generating circuit 802 extracts (samples) signal components from the video signal stored in the frame memory 801, the signal components corresponding to pixel positions a, b, c, and d, shown in FIG. 7.

For a first field (the former half field of one frame), a timing signal from a timing signal generator 803 allows video signals for the pixel positions a and d to be supplied to a driving circuit 804 and a driving circuit 805, respectively. Driving signals from the driving circuits 804 and 805 drive the first light modulating device 301 and the second modulating device 302, respectively. On the basis of the timing signal from the timing signal generator 803, a driving circuit 806 turns off the polarization rotatable liquid crystal panel 410 synchronously with a driving timing (display timing) for the first light modulating device 301 and second light modulating device 302. As a result, in the first field, a display state such as the one shown in FIG. 6A is obtained.

For a second field (the latter half field of one frame), a timing signal from the timing signal generator 803 allows video signals for the pixel positions b and c to be supplied to the driving circuit 804 and the driving circuit 805, respectively. Driving signals from the driving circuits 804 and 805 drive the first light modulating device 301 and the second modulating device 302, respectively. On the basis of the timing signal from the timing signal generator 803, the driving circuit 806 turns on the polarization rotatable liquid crystal panel 410 synchronously with the driving timing (display timing) for the first light modulating device 301 and second light modulating device 302. As a result, in the second field, a display state such as the one shown in FIG. 6B is obtained.

In this manner, a display of a four-point pixel shift such as the one shown in FIG. 7 is obtained. The screen 520 displays an image with pixels four times as many as the pixels of one light modulating device.

As described above, in the present embodiment, the pixels are shifted in the horizontal direction by the projection unit composed of the light path synthesizing section 200, the first light modulating device 301, and the second light modulating device 302. The pixels are further shifted in the vertical direction by the beam shifting section 400. That is, the pixels are shifted in the horizontal direction on the basis of the geometrical positional relationship between the first light modulating device 301 and the second light modulating device 302. The pixels are further shifted in the vertical direction by the temporal switching of a beam shifting operation performed by the beam shifting section 400. As a result, a display of a four-point pixel shift such as the one shown in FIG. 7 is realized. Thus, by combining the pixel shift based on the geometrical positional relationship with the pixel shift based on the temporal switching operation, it is possible to obtain an image free from flickering without significantly reducing the light intensity. Therefore, the present embodiment provides images with an excellent display quality and a high resolution.

In the present embodiment, as shown in FIGS. 6A, 6B, and 7, the direction in which the pixels are arranged in the first field (see FIG. 6A) crosses the direction in which the pixels are arranged in the second field (see FIG. 6B). Thus, temporal and spatial deviations in the displayed image are small. Also in this connection, the display quality is improved.

In the above embodiment, colors are not referred to. However, each of the first light modulating device 301 and second light modulating device 302 can be constructed using a single plate liquid crystal panel having an array of pixels in three colors including R, G, and B. In this case, the pixel pitch corresponds to that of each color. Further, in the above embodiment, the projection unit shifts the pixels in the horizontal direction, while the beam shifting section 400 shifts the pixels in the vertical direction. However, the projection unit may shift the pixels in the vertical direction, while the beam shifting section 400 may shift the pixels in the horizontal direction. More-over, in the above embodiment, the projection optical system 510 is placed between the beam shifting section 400 and the screen 520. However, the beam shifting section 400 may be placed between the projection optical system 510 and the screen 520.

Embodiment 2

Figure 9:
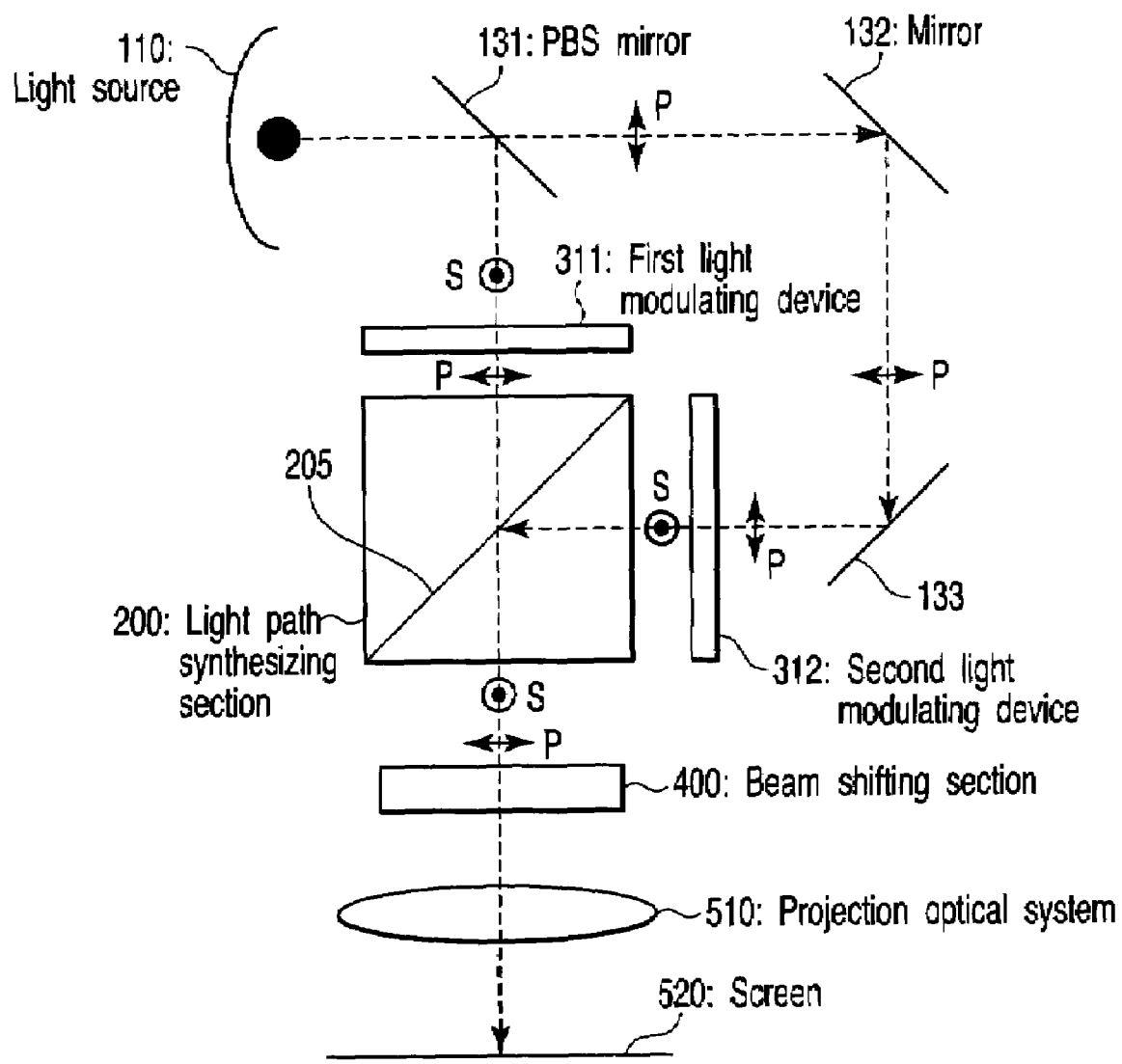
FIG. 9 is a view schematically showing an image projection apparatus using a light modulating unit according to a second embodiment of the present invention.

FIG. 9 is a diagram schematically showing an image projection apparatus using a light modulating unit according to a second embodiment of the present invention. Components corresponding to those in the first embodiment are denoted by the same reference numerals, with their detailed description omitted.

In the above first embodiment, each of the light modulating devices 301 and 302 is a reflection type LCD. In the present embodiment, light modulating devices 311 and 312 are transmission type LCDs.

In the present embodiment, an illumination light from a light source 110 is incident on a PBS mirror 131. The PBS mirror 131 separates the illumination light into a P-polarized light component and an S-polarized light component. The separated S-polarized light component is incident directly on a first light modulating device 311. As in the case of the first embodiment, the first light modulating device 311 rotates the incident S-polarized light component in accordance with a video signal to supply a P-polarized light component to a light path synthesizing section 200 composed of a PBS prism. The P-polarized light component separated by the PBS mirror 131 is reflected by mirrors 132 and 133 and then impinges against a second light modulating device 312. As in the case of the first embodiment, the second light modulating device 312 rotates the incident P-polarized light component in accordance with a video signal to supply an S-polarized light component to the light path synthesizing section 200. The other basic operations are the same as those of the first embodiment.

In the present embodiment, as in the case of the first embodiment, the pixels are shifted in the horizontal direction on the basis of the relative positional relationship between the first light modulating device 311 and the second light modulating device 312 (a pixel shift by half a pixel pitch). The pixels are further shifted in the vertical direction by a beam shifting operation performed by the beam shifting section 400 (a pixel shift by half a pixel pitch). As a result, a four-point pixel shift can be realized as in the case of the first embodiment. Further, operations and effects similar to those of the first embodiment can be obtained.

Embodiment 3

Figure 10:
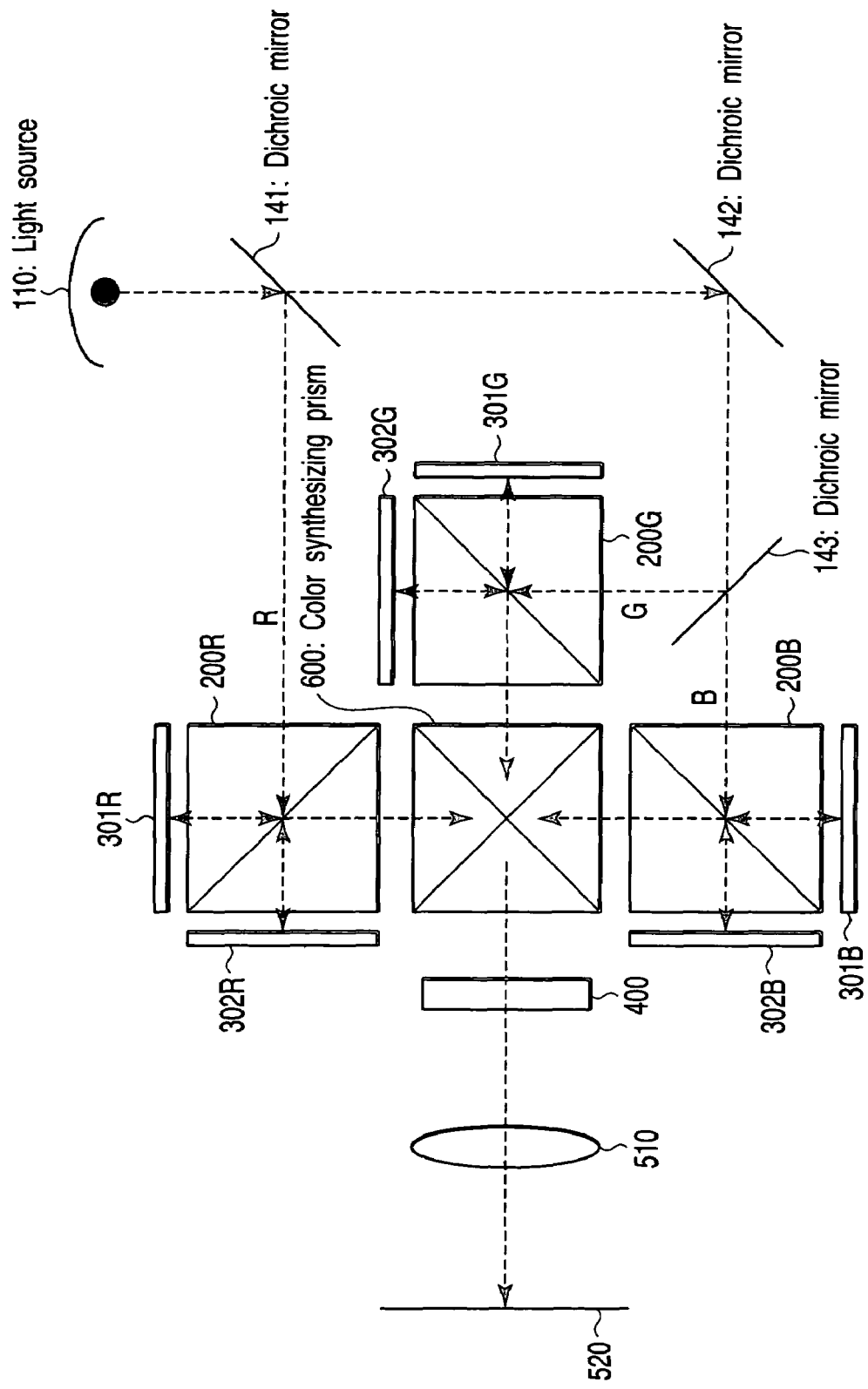
FIG. 10 is a view schematically showing an image projection apparatus using a light modulating unit according to a third embodiment of the present invention.

FIG. 10 is a diagram schematically showing an image projection apparatus using a light modulating unit according to a third embodiment of the present invention. Components corresponding to those in the first embodiment are denoted by the same reference numerals, with their detailed description omitted.

In the present embodiment, a color image is displayed using three projection units such as the one shown in the first embodiment.

An R (red) component of an illumination light from the light source 110 is reflected by a dichroic mirror 141. The other color components are transmitted through the dichroic mirror 141. The light transmitted through the dichroic mirror 141 is reflected by a dichroic mirror 142 and then impinges against a dichroic mirror 143. The dichroic mirror 143 reflects a G (green) light and allows a B (blue) light to pass through. In the present embodiment, the three primary colors are generated using the white light source and the dichroic mirrors. However, an exclusive light source may be provided for each of R, G, and B. For example, three light sources may be used including an R color LED, a G color LED, and a B color LED.

The thus separated R, G, and B lights are incident on light path synthesizing sections (PBS prisms) 200R, 200G, and 200B. The configuration of the light path synthesizing sections 200R, 200G, and 200B is similar to that of the light path synthesizing section 200, shown in the first embodiment. The polarization plane reflects an S-polarized light component and allows a P-polarized light component to pass through.

The light path synthesizing section 200R is accompanied by a first light modulating device 301R and a second light modulating device 302R. The light path synthesizing section 200G is accompanied by a first light modulating device 301G and a second light modulating device 302G. The light path synthesizing section 200B is accompanied by a first light modulating device 301B and a second light modulating device 302B. The configuration and functions of these light modulating devices (reflection type LCDs) are the same as those of the light modulating devices shown in the first embodiment. Accordingly, as in the case of the first embodiment, the light path synthesizing section 200R synthesizes a P-polarized light from the first light modulating device 301R and an S-polarized light from the second light modulating device 302R. The synthesized light is emitted by the light path synthesizing section 200R. This also applies to the light path synthesizing section 200G and light path synthesizing section 200B.

The R, G, and B lights emitted by the light path synthesizing sections 200R, 200G, and 200B are incident on a color synthesizing prism 600. The color synthesizing prism 600 synthesizes the R, G, and B lights using the nature of the wavelength of each color. The color synthesizing prism is composed of a dichroic prism (X prism). Since both P-polarized light and S-polarized light are incident on the X prism, the difference between its characteristic for the P-polarized light and its characteristic for the S-polarized light (a difference in reflection characteristic and a difference in transmission characteristic) is desirably small. For example, the difference in reflectance between the P-polarized light and the S-polarized light is desirably at most 20%.

As in the case of the first embodiment, a projection light synthesized by the color synthesizing prism 600 reaches the screen 520 via the beam shifting section 400 and the projection optical system 510. As a result, as in the case of the first embodiment, a four-point pixel shift can be realized. In this case, the light modulating devices are arranged so that the pixel positions for R, G, and B coincide with one another after a four-point pixel shift. In other words, the projection pixel positions for R, G, and B are superimposed on one another at each of the pixel positions (a), (b), (c), and (d) shown in FIG. 7.

In the present embodiment, as in the case of the first embodiment, the pixels are shifted in the horizontal direction on the basis of the relative positional relationship between the first light modulating devices 301R, 301G, and 301B and the second light modulating devices 302R, 302G, and 302B (a pixel shift by half a pixel pitch). The pixels are further shifted in the vertical direction by a beam shifting operation performed by the beam shifting section 400 (a pixel shift by half a pixel pitch). As a result, a four-point pixel shift can be realized as in the case of the first embodiment. Further, operations and effects similar to those of the first embodiment can be obtained.

Embodiment 4

Figure 11:
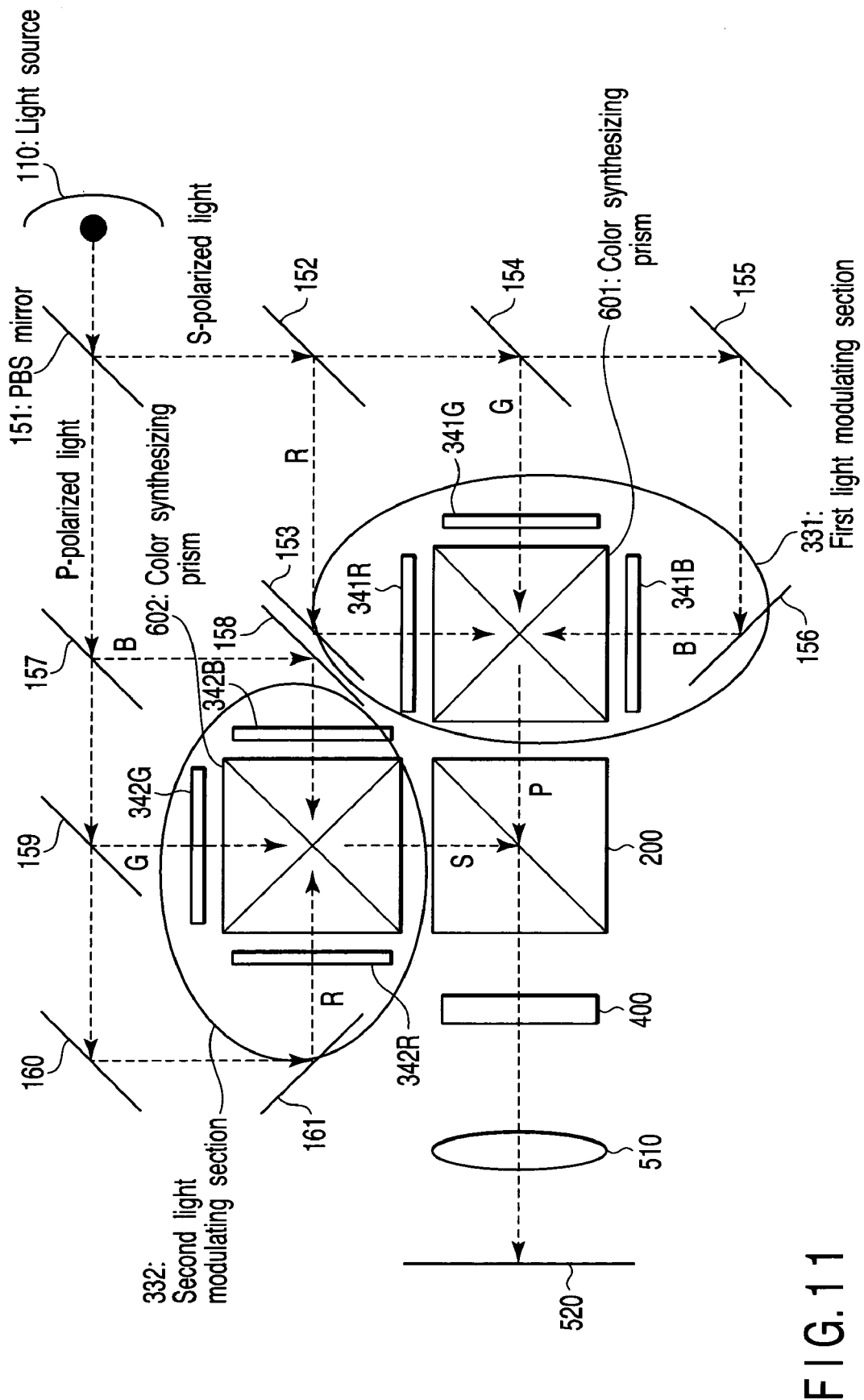
FIG. 11 is a view schematically showing an image projection apparatus using a light modulating unit according to a fourth embodiment of the present invention.

FIG. 11 is a diagram schematically showing an image projection apparatus using a light modulating unit according to a fourth embodiment of the present invention. Components corresponding to those in the first embodiment are denoted by the same reference numerals, with their detailed description omitted.

In the present embodiment, a color image is also displayed using a principle similar to that of a four-point pixel shift, shown in the first embodiment.

An illumination light from the light source 110 is incident on a PBS mirror 151. The PBS mirror 151 then separates the light into a P-polarized light component and an S-polarized light component. The S-polarized light separated by the PBS mirror 151 is color-separated into an R light, a G light, and a B light by dichroic mirror 152 to 156. The P-polarized light separated by the PBS mirror 151 is color-separated into an R light, a G light, and a B light by dichroic mirror 157 to 161. The color-separated S-polarized light is supplied to a first light modulating section 331. The color-separated P-polarized light is supplied to a second light modulating section 332.

The first light modulating section 331 is composed of a first light modulating device 341R for the R color, a first light modulating device 341G for the G color, a first light modulating device 341B for the B color, and a color synthesizing prism 601. The basic configuration of the first light modulating devices 341R, 341G, and 341B is similar to that of the light modulating device 311, shown in FIG. 9. That is, any of the first light modulating devices 341R, 341G, and 341B rotates an incident S-polarized light to obtain a P-polarized light. The basic configuration of the color synthesizing prism 601 is similar to the color synthesizing prism 600, shown in FIG. 10. The color synthesizing prism 601 synthesizes an R, G, and B lights emitted by the first light modulating devices 341R, 341G, and 341B, respectively, and emits a projection light of the P-polarized light.

The second light modulating section 332 is configured similarly to the first light modulating section 331. The color synthesizing prism 602 synthesizes an R, G, and B lights emitted by the second light modulating devices 342R, 342G, and 342B, respectively, and emits a projection light of the S-polarized light.

The light path synthesizing section 200 is supplied with the projection light of the P-polarized light color-synthesized by the color synthesizing prism 601 and the projection light of the S-polarized light color-synthesized by the color synthesizing prism 602. As in the case of the first embodiment, the projection light emitted by the light path synthesizing section 200 reaches the screen 520 via the beam shifting section 400 and projection optical system 510. As a result, a four-point pixel shift can be realized as in the case of the first embodiment. As also described in the third embodiment, the light modulating devices are of course arranged so that the pixel positions for R, G, and B coincide with one another after a four-point pixel shift.

In the present embodiment, as in the case of the first embodiment, the pixels are shifted in the horizontal direction on the basis of the relative positional relationship between the first light modulating devices 341R, 341G, and 341B and the second light modulating devices 342R, 342G, and 342B (a pixel shift by half a pixel pitch). The pixels are further shifted in the vertical direction by a beam shifting operation performed by the beam shifting section 400 (a pixel shift by half a pixel pitch). As a result, a four-point pixel shift can be realized as in the case of the first embodiment. Further, operations and effects similar to those of the first embodiment can be obtained.

Embodiment 5

Figure 12:
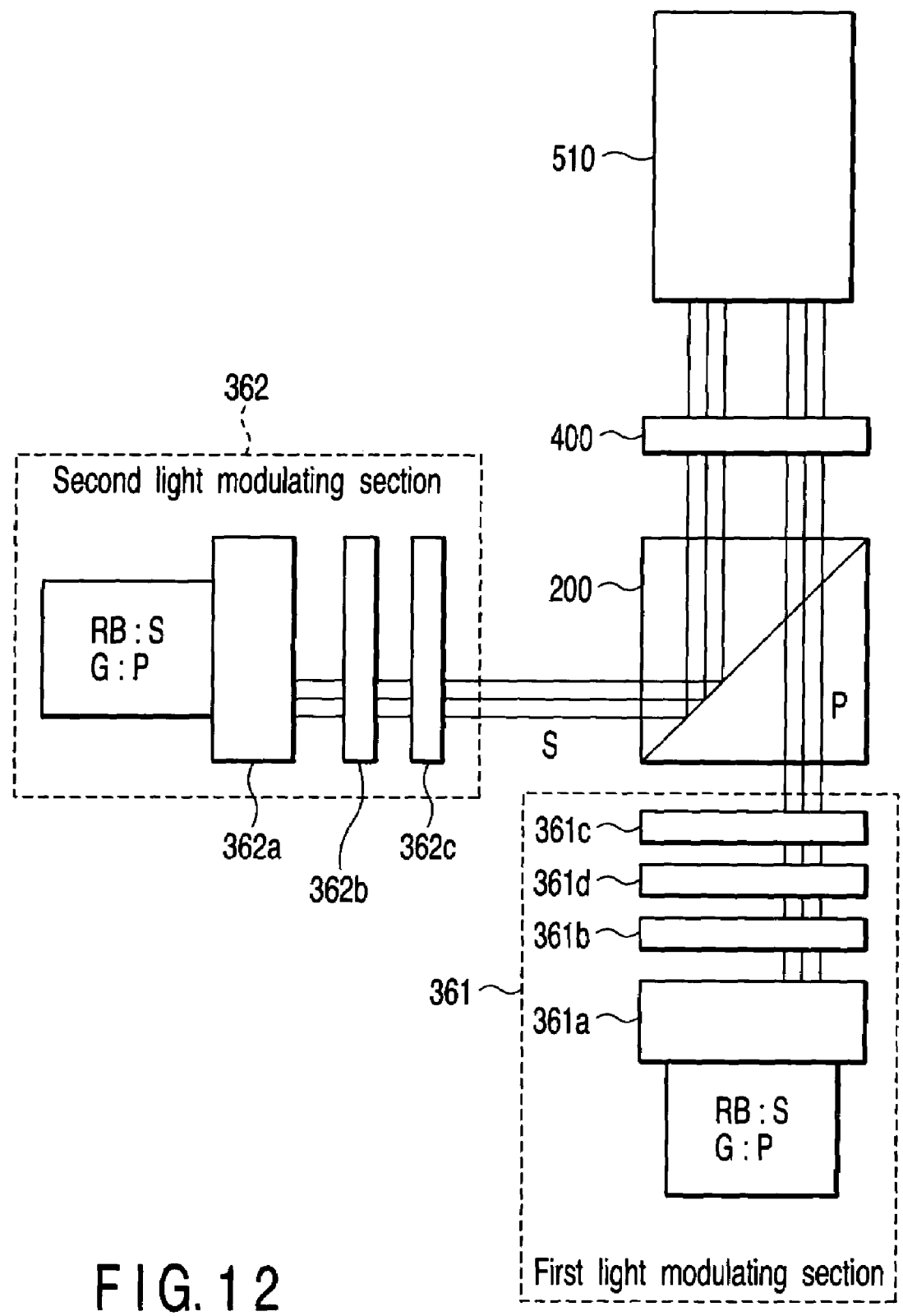
FIG. 12 is a view schematically showing an image projection apparatus using a light modulating unit according to a fifth embodiment of the present invention.

FIG. 12 is a diagram schematically showing an image projection apparatus using a light modulating unit according to a fifth embodiment of the present invention. Components corresponding to those in the first embodiment are denoted by the same reference numerals, with their detailed description omitted.

In the present embodiment, a color image is also displayed using a principle similar to that of a four-point pixel shift, shown in the first embodiment.

In the present embodiment, a first light modulating section 361 generates a three-primary-color image of a P-polarized light. A second light modulating section 362 generates a three-primary-color image of an S-polarized light.

The first light modulating section 361 is composed of a light modulating device block 361a, an optical rotatory plate 361b, a λ/2 plate (half-wave plate) 361d, and a polarizing plate 361c. The light modulating device block 361a is an LCD unit of an RGB three-plate system. For a G light, the light modulating device block 361a emits a projection light of a P-polarized light. For R and B lights, the light modulating device block 361a emits a projection light of an S-polarized light. Of the G light (P-polarized light) and R and B lights (S-polarized lights) emitted by the light modulating device block 361a, the optical rotatory plate 361b rotates only one light, the G light, to obtain an S-polarized light. Consequently, the optical rotatory plate 361b emits an S-polarized light for all of the R, G, and B lights. Moreover, the S-polarized light from the optical rotatory light 361b is rotated by the λ/2 plate 361d to become a P-polarized light. The P-polarized light from the λ/2 plate 361d is made by the polarization plate 361c to be sharper. The sharper P-polarized light is then supplied to the light path synthesizing section 200.

The second light modulating section 362 is composed of a light modulating device block 362a, an optical rotatory plate 362b, and a polarizing plate 362c. The light modulating device block 362a is an LCD unit of an RGB three-plate system. For a G light, the light modulating device block 362a emits a projection light of a P-polarized light. For an R and B lights, the light modulating device block 362a emits a projection light of an S-polarized light. Of the G light (P-polarized light) and R and B lights (S-polarized lights) emitted by the light modulating device block 362a, the optical rotatory plate 362b rotates only the G light to obtain an S-polarized light. Consequently, the optical rotatory plate 361b emits an S-polarized light for all of the R, G, and B lights. The S-polarized light from the optical rotatory plate 361b is made by the polarization plate 361c to be sharper. The sharper S-polarized light is then supplied to the light path synthesizing section 200.

As is apparent from the above description, the basic configuration of the first light modulating section 361 is similar to that of the second light modulating section 362. The first light modulating section 361 has the additional λ/2 plate 361d to rotate an S-polarized light to obtain a P-polarized light. The P-polarized light is then supplied to the light path synthesizing section 200.

The projection light synthesized by the light path synthesizing section 200 reaches the screen (not shown) via the beam shifting section 400 and projection optical system 510 as in the case of the first embodiment. As a result, a four-point pixel shift can be realized as in the case of the first embodiment. As already described, the light modulating devices are arranged so that the pixel positions for R, G, and B coincide with one another after a four-point pixel shift.

In the present embodiment, as in the case of the first embodiment, the pixels are shifted in the horizontal direction on the basis of the relative positional relationship between the light modulating devices included in the light modulating device block 361a and the light modulating devices included in the light modulating device block 362a (a pixel shift by half a pixel pitch). The pixels are further shifted in the vertical direction by a beam shifting operation performed by the beam shifting section 400 (a pixel shift by half a pixel pitch). As a result, a four-point pixel shift can be realized as in the case of the first embodiment. Further, operations and effects similar to those of the first embodiment can be obtained. Furthermore, in the present embodiment, the basic configuration of the first light modulating section 361 may be the same as that of the second light modulating section 362 except for the λ/2 plate 361d.

Embodiment 6

Figure 13:
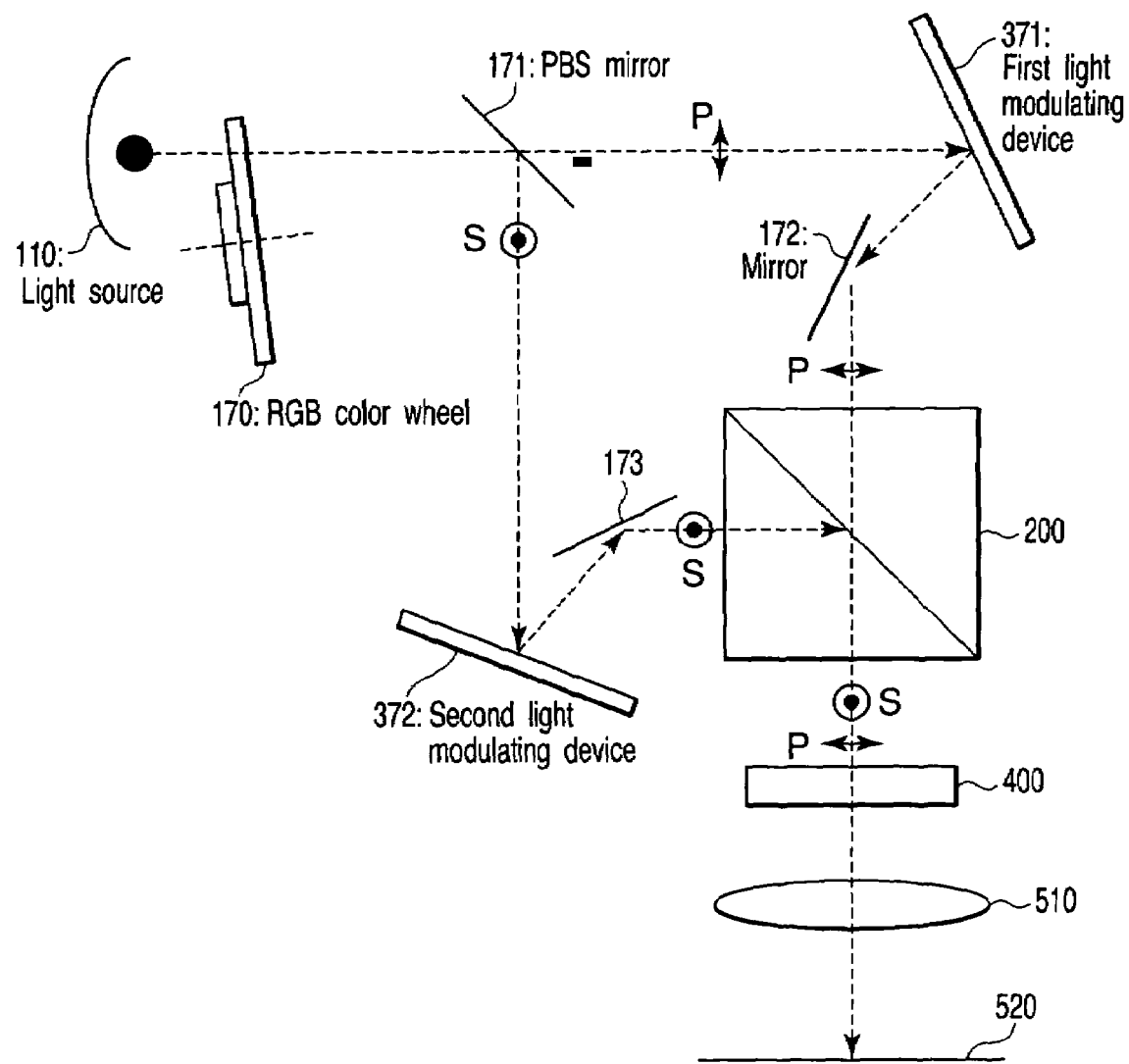
FIG. 13 is a view schematically showing an image projection apparatus using a light modulating unit according to a sixth embodiment of the present invention.

FIG. 13 is a diagram schematically showing an image projection apparatus using a light modulating unit according to a sixth embodiment of the present invention. Components corresponding to those in the first embodiment are denoted by the same reference numerals, with their detailed description omitted.

In the above embodiments, the light modulating devices are LCDs. However, in the present embodiment, the light modulating devices are DMDs (Digital Micromirror Devices).

An illumination light from the light source 110 reaches a PBS mirror 171 via an RGB color wheel 170. The PBS mirror 171 then separates the light into a P-polarized light and an S-polarized light. The P-polarized light is spatially modulated by a first light modulating device 371 composed of a DMD. The modulated light is then supplied to the light path synthesizing section 200 via a mirror 172. The S-polarized light is spatially modulated by a second light modulating device 372 composed of a DMD. The modulated light is then supplied to the light path synthesizing section 200 via a mirror 173.

The projection light synthesized by the light path synthesizing section 200 reaches the screen 520 via the beam shifting section 400 and projection optical system 510 as in the case of the first embodiment. As a result, a four-point pixel shift can be realized as in the case of the first embodiment. As already described, the light modulating devices are arranged so that the pixel positions for R, G, and B coincide with one another after a four-point pixel shift.

In the present embodiment, as in the case of the first embodiment, the pixels are shifted in the horizontal direction on the basis of the relative positional relationship between the first light modulating device 371 and the second light modulating device 372 (a pixel shift by half a pixel pitch). The pixels are further shifted in the vertical direction by a beam shifting operation performed by the beam shifting section 400 (a pixel shift by half a pixel pitch). As a result, a four-point pixel shift can be realized as in the case of the first embodiment. Further, operations and effects similar to those of the first embodiment can be obtained.

Embodiment 7

The present embodiment determines whether or not the amount of input image information contained in an input video signal is larger than the amount of display image information that can be displayed by each light modulating unit. If the amount of input image information is larger than the amount of display image information (high resolution mode), an image of a relatively high resolution is displayed by a four-point pixel shift as already described. If the amount of input image information is smaller than the amount of display image information (low resolution mode), an image of a relatively low resolution is displayed.

For example, the description below assumes an HDTV (1,920×1,080 pixels) as a high resolution image and an SDTV (960×540 pixels) as a low resolution image. An HDTV-equivalent image can be displayed by using two LCDs for SDTV to carry out a four-point pixel shift.

If an SDTV image is inputted, a high resolution image equivalent to an HDTV image is not obtained even by carrying out a four-point pixel shift as in the case of the HDTV image. Instead, the four-point pixel shift for the SDTV image causes the image to flicker. It is contemplated that the beam shifting section 400 may not perform a shifting operation for SDTV images (the liquid crystal panel 410 is always kept off). However, this always results in an image display state such as the one shown in FIG. 6A. It is thus difficult to obtain a smooth display.

Thus, in the present embodiment, a voltage in a state midway between an on state and an off state is applied to the liquid crystal panel 410 for the SDTV image. Specifically, such a voltage as sets the polarization rotation angle of the liquid crystal panel 410 at about 45° is always applied to the liquid crystal panel 410. With the polarization rotation angle thus set at 45°, the birefringence plate 420 separates the incident beam into an ordinary light (no) and an extraordinary light (ne) so that these lights have an almost equal quantity of light. Consequently, a pixel display state such as the one shown in FIG. 14 can be realized by continuously applying a predetermined intermediate voltage to the liquid crystal panel 410. That is, in each field, substantially the same image is displayed at the pixel positions a and b. Further, substantially the same image is displayed at the pixel positions c and d. In other words, an image is displayed which has undergone a spatial low pass filter action in the vertical direction.

Figure 15:
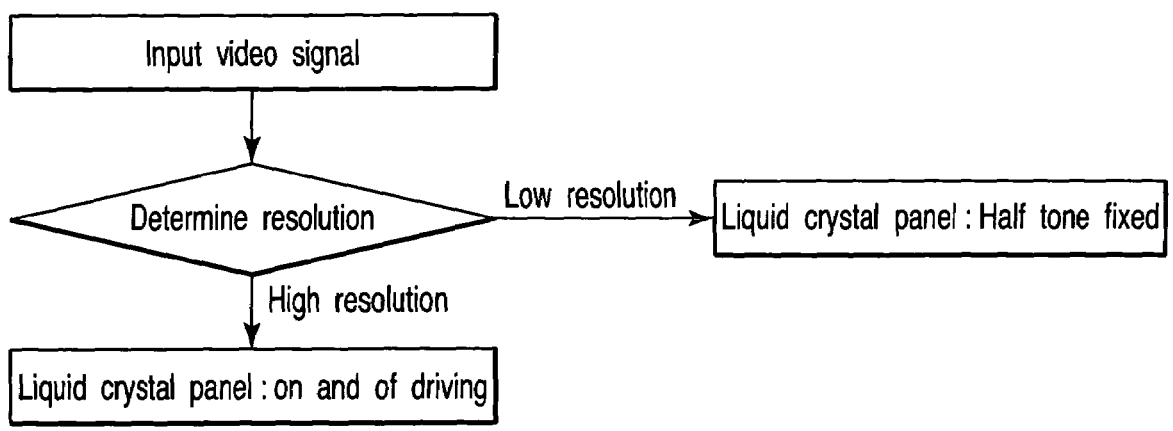
FIG. 15 is a flow chart showing an operation of the image projection apparatus according to the seventh embodiment of the present invention.

FIG. 15 is a flow chart showing an operation according to the present embodiment.

A resolution determining section (not shown) determines whether or not the amount of input image information contained in an input video signal is larger than the amount of display image information that can be displayed by each light modulating unit, that is, whether the number of pixels of the input video signal is larger or smaller than the number of pixels that can be displayed by each light modulating device (for example, 960×540 pixels). A high resolution mode is selected if the amount of input image information is larger than the amount of display image information. A low resolution mode is selected if the amount of input image information is smaller than the amount of display image information.

If a video signal of a high resolution (HDTV or the like) is inputted and the high resolution mode is selected, a four-pixel pixel shift is carried out as already described in the above embodiments. Specifically, the liquid crystal panel 410 is repeatedly turned on and off for each field to sequentially switch the liquid crystal panel 410 between the two states, that is, determine whether or not to rotate the direction of polarization of the projection light through 90°. Further, video signals are sampled at the pixel positions a, b, c, and d.

Figure 14:
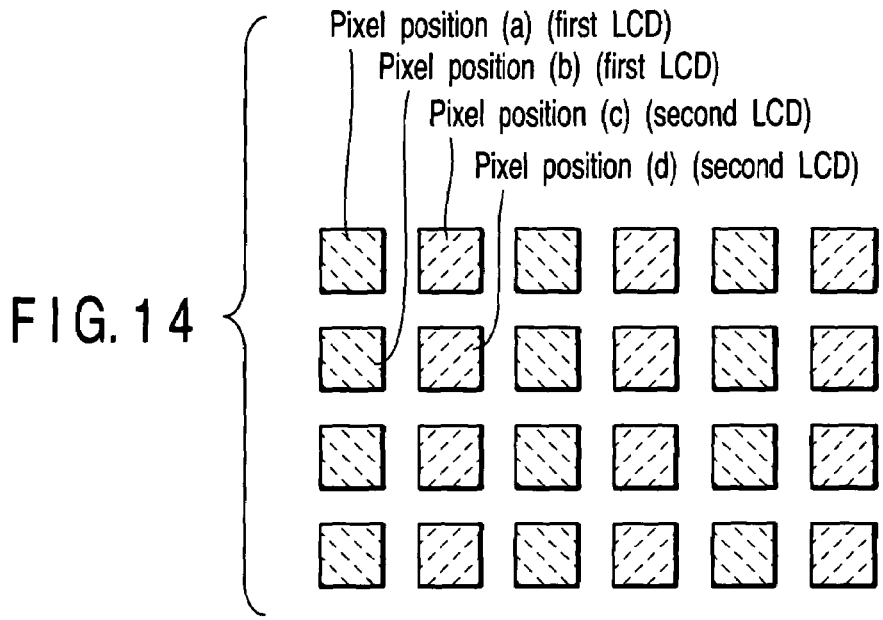
FIG. 14 is a diagram showing an array of pixels of light modulating devices on a projection plane after projection lights have passed through a beam shifting section, according to the seventh embodiment of the present invention.

If a video signal of a low resolution (SDTV or the like) is inputted and the low resolution mode is selected, the liquid crystal panel 410 is maintained in a fixed state (half tone state) so as to rotate the direction of polarization of the projection light through 45°. Further, video signals are sampled at the pixel positions a and d (or b and c or a and c or b and d). Thus, a display such as the one shown in FIG. 14 is obtained.

As described above, in the present embodiment, in the high resolution mode, by carrying out a four-point pixel shift as in the case of the first embodiment, it is possible to obtain operations and effects similar to those of the first embodiment. Further, in the present embodiment, different display methods are used in the high resolution mode and in the low resolution mode. This enables the appropriate display corresponding to each of the high and low resolution modes.

Embodiment 8

The present embodiment realizes a three dimensional image (3-D image) display using a technique similar to that described above in the first to sixth embodiments. The basic configuration of the present embodiment is similar to that of the first embodiment. In the description below, components corresponding to those in the first embodiment are denoted by the same reference numerals, with their detailed description omitted.

Some image projection apparatuses for 3-D image display are called polarization eyeglass systems. With the polarization eyeglass system, for example, an S-polarized light image is used as a left eye image (L image). A P-polarized light image is used as a right eye image (R image). A user observes a 3-D image with a pair of eyeglasses comprising a S-polarized light polarizing plate for the left eye and a P-polarized light polarizing plate for the right eye.

The pixel arrangement for obtaining a 3-D image may be similar to that described in the first embodiment and the like (see FIGS. 4, 6, and 7). However, in the present embodiment, the pixel arrangement shown below is employed.

In the first embodiment, the first light modulating device 301 and the second light modulating device 302 are arranged offset from each other by half a pixel pitch only in the horizontal direction as shown in FIG. 4. However, in the present embodiment, as shown in FIG. 16, the first light modulating device 301 and the second light modulating device 302 are arranged offset from each other by half a pixel pitch not only in the horizontal direction but also in the vertical direction. FIG. 16 is a diagram showing an array of pixels on the projection plane (screen plane), of both first light modulating device 301 and second light modulating device 302, after projection lights have been synthesized by the light path synthesizing section, as shown in FIG. 4.

Figure 17A:
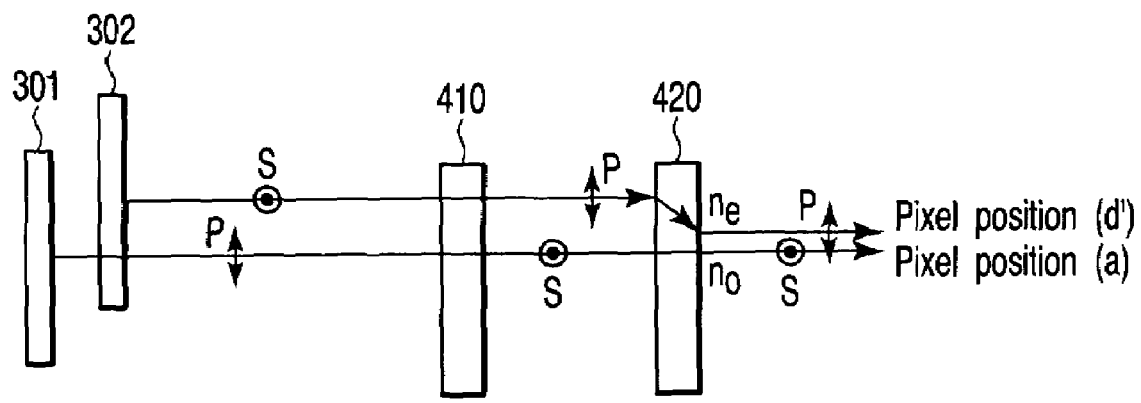
FIGS. 17A and 17B are diagrams illustrating the action of a light modulating unit according to the eighth embodiment of the present invention.
Figure 17B:
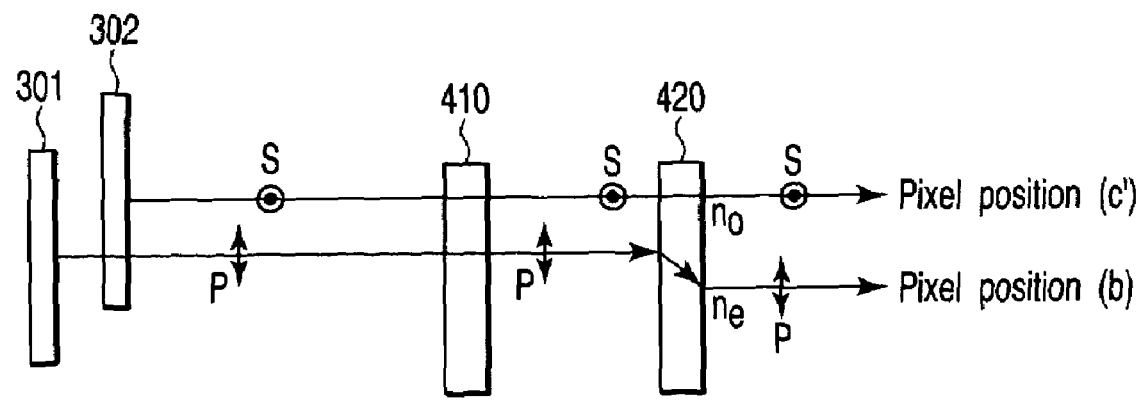

FIGS. 17A and 17B are diagrams illustrating the action of a light modulating unit according to the present embodiment. FIG. 17A shows the case where the voltage applied to the liquid crystal panel 410 is off. FIG. 17B shows the case where the voltage applied to the liquid crystal panel 410 is on. For convenience, the light path synthesizing section is not shown.

Figure 18A:
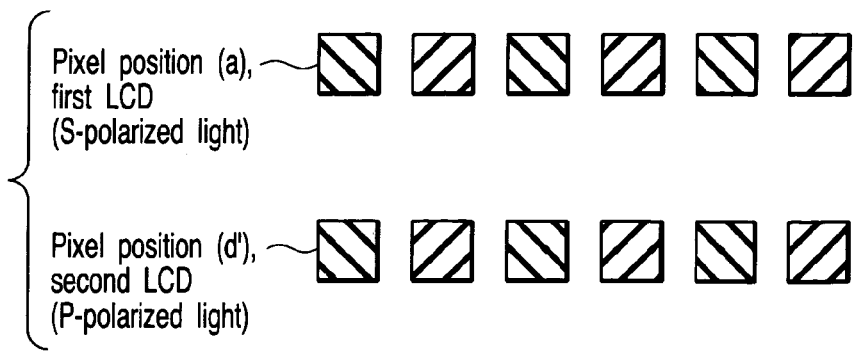
FIGS. 18A and 18B are diagrams showing the array of pixels of the light modulating devices on the projection plane after the projection lights have passed through a beam shifting section, according to the eighth embodiment of the present invention.
Figure 18B:
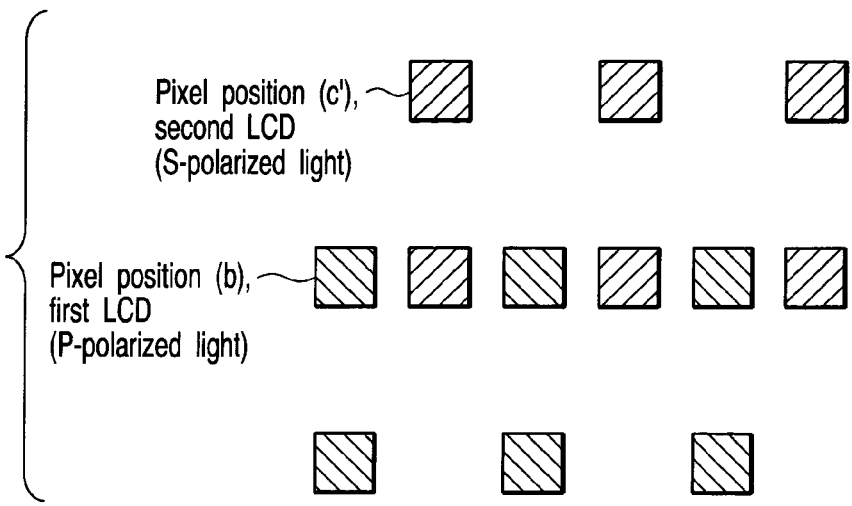

FIGS. 18A and 18B are diagrams showing the array of pixels on the projection plane (screen plane), of the first light modulating device (first LCD) 301 and second light modulating device (second LCD) 302, after the projection lights have passed through a beam shifting section composed of the liquid crystal panel 410 and the birefringence plate 420. FIG. 18A shows the case where the voltage applied to the liquid crystal panel 410 is off. FIG. 18B shows the case where the voltage applied to the liquid crystal panel 410 is on.

As described above, the first light modulating device 301 and the second light modulating device 302 are arranged offset from each other by half a pixel pitch not only in the horizontal direction but also in the vertical direction. Thus, the P-polarized light from the first light modulating device 301 and the S-polarized light from the second light modulating device 302 are already offset from each other by half a pixel pitch in the vertical direction before entering the liquid crystal panel 410.

Accordingly, as shown in FIG. 17A, if the liquid crystal panel 410 is off, the projection light from the first light modulating device 301 and the projection light from the second light modulating device 302 have an equal height in the vertical direction after passing through the birefringence plate 420. As a result, on the projection plane (screen plane), the pixel position (a) of the projection light from the first light modulating device 301 and the pixel position (d') of the projection light from the second light modulating device 302 are offset from each other by half a pixel pitch in the horizontal direction but are not offset in the vertical direction, as shown in FIG. 18A.

Further, as shown in FIG. 17B, if the liquid crystal panel 410 is on, the projection light from the first light modulating device 301 and the projection light from the second light modulating device 302 are offset from each other by one pixel pitch in the vertical direction. As a result, on the projection plane (screen plane), the pixel position (b) of the projection light from the first light modulating device 301 and the pixel position (c') of the projection light from the second light modulating device 302 are offset from each other by half a pixel pitch in the horizontal direction and by one pixel pitch in the vertical direction, as shown in FIG. 18B.

As already described, in the present embodiment, the S-polarized light image is used as an L image. The P-polarized light image is used as an R image. Accordingly, when the liquid crystal panel 410 is off, the S-polarized light image at the pixel position (a) corresponding to the first light modulating device 301 is displayed as an L image. The P-polarized light image at the pixel position (d') corresponding to the second light modulating device 302 is displayed as an R image. When the liquid crystal panel 410 is on, the S-polarized light image at the pixel position (c') corresponding to the second light modulating device 302 is displayed as an L image. The P-polarized light image at the pixel position (b) corresponding to the first light modulating device 301 is displayed as an R image.

Figure 19:
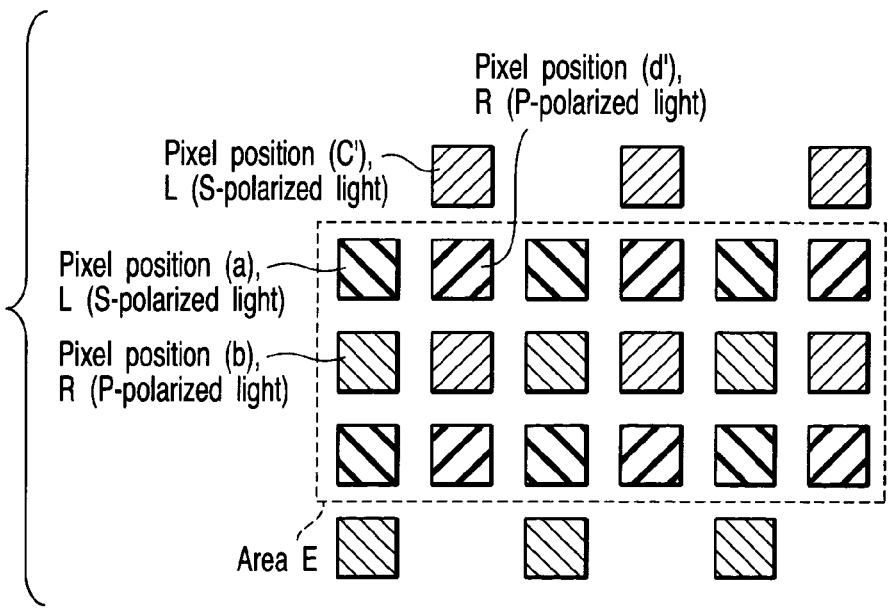
FIG. 19 is a diagram showing the array of pixels of the light modulating devices on the projection plane after the projection lights have passed through the beam shifting section, according to the eighth embodiment of the present invention.

FIG. 19 is a diagram showing a pixel array state obtained by synthesizing the display state in FIG. 18A and the display state in FIG. 18B. As shown in FIG. 19, a unit display area is composed of the pixel positions (a), (b), (c'), and (d'). In FIG. 19, there are no pixels adjacent to pixels around the periphery of a rectangular area E in the horizontal direction. Thus, the pixels may appear serrated or flickering around the periphery of the image, thus degrading the display quality. Therefore, the pixels outside the rectangular area E may be displayed as a black image.

FIG. 20 is a table illustrating the temporal flow of the display state in the 3-D image projection apparatus according to the present embodiment.

As shown in FIG. 20, in the first field of each frame, the first light modulating device displays an L image (S-polarized light image) at the pixel position (a). The second light modulating device displays an R image (P-polarized light image) at the pixel position (d'). In the second field, the first light modulating device displays an R image (P-polarized light image) at the pixel position (b). The second light modulating device displays an L image (S-polarized light image) at the pixel position (c').

Thus, in the present embodiment, 3-D images with an excellent display quality and a high resolution can be obtained by combining the pixel shift based on the geometrical positional relationship with the pixel shift based on the temporal switching operation as in the case of the first embodiment or the like. Further, since the pixel positions of the L and R images are reversed in the horizontal direction for each field, it is possible to obtain 3-D images with reduced temporal and spatial deviations in the displayed image as well as an excellent display quality.

As described above, according to the present invention, images with an excellent display quality and a high resolution can be obtained by combining the pixel shift based on the geometrical positional relationship with the pixel shift based on the temporal switching operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light modulating unit which modulates an illumination light on the basis of an inputted video signal, the light modulating unit comprising:
    first and second light modulating sections each of which modulates an illumination light on the basis of a video signal to generate a projection light that is a linearly polarized light;
    a light path synthesizing section which synthesizes the projection lights generated by the first and second light modulating sections, wherein the light path synthesizing section has a polarization plane, and the projection light generated by the first light modulating section and having a first polarization direction passes through the polarization plane, and the projection light generated by the second light modulating section and having a second polarization direction perpendicular to the first polarization direction is reflected by the polarization plane; and
    a beam shifting section which sets beams of the projection lights synthesized by the light path synthesizing section, in a shifted state or a non-shifted state on the basis of the directions of polarizations of the projection lights, the beam shifting section switching the shifted state and the non-shifted state synchronously with modulation timings for the first and second light modulating sections.

2. The light modulating unit according to claim 1, wherein a positional relationship between the first and second light modulating sections is determined so that pixel positions of the projection lights generated by the first and second light modulating sections and synthesized by the light path synthesizing section are adjacent to each other in a predetermined direction.

3. The light modulating unit according to claim 2, wherein if an amount of input image information contained in the video signal is larger than an amount of display image information which can be displayed by each of the first and second light modulating sections, the beam shifting section sequentially sets the projection lights generated by the first and second light modulating sections, in the shifted state and the non-shifted state in a direction orthogonal to the predetermined direction, and
    if the amount of input image information is smaller than the amount of display image information, the beam shifting section applies a spatial low pass filter action to the projection lights generated by the first and second light modulating sections, in the direction orthogonal to the predetermined direction.

4. The light modulating unit according to claim 1, wherein the beam shifting section includes a liquid crystal panel which can rotate the direction of polarization of the projection light and a birefringence plate which generates a transmission light which is offset from an extension of an incident light if the incident light has a particular direction of polarization, and
    the liquid crystal panel rotates the direction of polarization of the projection light synchronously with the modulation timings for the first and second light modulating sections.

5. The light modulating unit according to claim 4, wherein if an amount of input image information contained in the video signal is larger than an amount of display image information which can be displayed by each of the first and second light modulating sections, the liquid crystal panel sequentially assumes two states in which the liquid crystal panel rotates or does not rotate the direction of polarization of the projection light through 90°, and
    if the amount of input image information is smaller than the amount of display image information, the liquid crystal panel maintains one state in which the liquid crystal panel rotates the direction of polarization of the projection light through 45°.

6. The light modulating unit according to claim 1, wherein the light modulating unit comprises a plurality of sets each composed of the first and second light modulating sections and the light path synthesizing section, the first and second light modulating sections in each set generating projection lights of the same color, colors of the projection lights being different between the sets,
    the light modulating unit further comprises a color synthesizing prism which synthesizes the projection lights from the respective sets, and
    the beam shifting section shifts the beams of the projection lights synthesized by the color synthesizing prism on the basis of the directions of polarizations of the projection lights.

7. The light modulating unit according to claim 6, wherein the number of sets is three and the colors of the projection lights in the respective sets are red, blue, and green.

8. The light modulating unit according to claim 1, wherein the light path synthesizing section is composed of a polarization beam splitter having a first to sixth planes and a polarization plane,
    the first and second light modulating sections are composed of first and second light modulating devices, respectively, arranged opposite the first and second planes that are not perpendicular to the polarization plane of the polarization beam splitter, and when the illumination light is incident on the third plane which is not perpendicular to the polarization plane and which is different from the first and second planes, the first light modulating device is illuminated by an S-polarized light component of the illumination light reflected by the polarization plane, and the second light modulating device is illuminated by a P-polarized light component of the illumination light passing through the polarization plane.

9. The light modulating unit according to claim 1, wherein each of the first and second light modulating sections includes a plurality of light modulating devices which generate projection lights having different colors and a color synthesizing prism which synthesizes the projection lights generated by the plurality of light modulating devices, and the direction of polarization of the projection light emitted by the color synthesizing prism of the first light modulating section is orthogonal to the direction of polarization of the projection light emitted by the color synthesizing prism of the second light modulating section.

10. The light modulating unit according to claim 1, wherein one of the first and second light modulating sections has a .lambda./2 plate which makes the direction of polarization of the projection light emitted by the first light modulating section orthogonal to the direction of polarization of the projection light emitted by the second light modulating section.

11. The light modulating unit according to claim 1, wherein the light path synthesizing section is composed of a polarization beam splitter, and a projection light of a P-polarized light and a projection light of an S-polarized light are incident on the beam shifting section.

12. An image projection apparatus comprising:
the light modulating unit according to claim 1,
a light source which supplies an illumination light to the first and second light modulating sections, and a projection optical section which projects the projection light from the beam shifting section on a screen.

13. The image projection apparatus according to claim 12, wherein the positional relationship between the first and second light modulating sections is determined so that a pixel position of the projection light generated by the first light modulating section and synthesized by the light path synthesizing section is offset from a pixel position of the projection light generated by the second light modulating section and synthesized by the light path synthesizing section by half a pixel pitch in a predetermined direction, and the beam shifting section is configured so that a pixel position of the projection light in the shifted state is offset from a pixel position of the projection light in the non-shifted state by half a pixel pitch in a direction orthogonal to the predetermined direction.

14. The image projection apparatus according to claim 13, wherein the light path synthesizing section is composed of a polarization beam splitter, and one of beams of the projection lights generated by the first and second light modulating sections is shifted by the beam shifting section, and the other beam is not shifted by the beam shifting section.

15. The image projection apparatus according to claim 12, further comprising an extracting section which extracts, from the video signal, a signal corresponding to a projection light for each pixel emitted by the beam shifting section, and wherein the first and second light modulating sections modulate the illumination light on the basis of the signal extracted by the extracting section.

16. An image projection apparatus which uses the light modulating unit set forth in claim 1 to project images based on right and left eye video signals on a screen in order to allow a three-dimensional image to be observed using a pair of polarization glasses in which a direction of polarization for a right eye and a direction of polarization for a left eye cross at right angles, wherein if one of the first and second light modulating sections modulates an illumination light on the basis of the right eye video signal, the other of the first and second light modulating sections modulates the illumination light on the basis of the left eye video signal, the positional relationship between the first and second light modulating sections is determined so that a pixel position of the projection light generated by the first light modulating section and synthesized by the light path synthesizing section is offset from a pixel position of the projection light generated by the second light modulating section and synthesized by the light path synthesizing section by half a pixel pitch in a predetermined direction, and the beam shifting section is configured so that a pixel position of the projection light in the shifted state is offset from a pixel position of the projection light in the non-shifted state by half a pixel pitch in a direction orthogonal to the predetermined direction.

17. The image projection apparatus according to claim 16, further comprising an extracting section which extracts, from the video signal, a signal corresponding to a projection light for each pixel emitted by the beam shifting section, and wherein the first and second light modulating sections modulate the illumination light on the basis of the signal extracted by the extracting section.

18. A light modulating unit which modulates an illumination light on the basis of an inputted video signal, the light modulating unit comprising:

at least one light modulating section which modulates an illumination light on the basis of a video signal to generate a projection light that is a linearly polarized light; and a beam shifting section which sets a beam of the projection light generated by the light modulating section, in a shifted state or a non-shifted state on the basis of a direction of polarization of the projection light, the beam shifting section switching the shifted state and the non-shifted state synchronously with a modulation timing for the light modulating section, wherein if an amount of input image information contained in the video signal is larger than an amount of display image information which can be displayed by the light modulating section, the beam shifting section sequentially sets the beam of the projection light in the shifted state and the non-shifted state, and if the amount of input image information is smaller than the amount of display image information, the beam shifting section does not sequentially set the beam of the projection light in the shifted state and the non-shifted state but fixes the beam in one state.

19. The light modulating unit according to claim 18, wherein the beam shifting section includes a liquid crystal panel which can rotate the direction of polarization of the projection light and a birefringence plate which generates a transmission light which is offset from an extension of an incident light if the incident light has a particular direction of polarization, if the amount of input image information is larger than the amount of display image information, the liquid crystal panel sequentially assumes two states in which the liquid crystal panel rotates or does not rotate the direction of polarization of the projection light through 90°, and if the amount of input image information is smaller than the amount of display image information, the liquid crystal panel maintains one state in which the liquid crystal panel rotates the direction of polarization of the projection light through 45°.

20. A light modulating unit which modulates an illumination light on the basis of an inputted video signal, the light modulating unit comprising:

first and second light modulating means each of which modulates an illumination light on the basis of a video signal to generate a projection light that is a linearly polarized light;

light path synthesizing means which synthesizes the projection lights generated by the first and second light modulating means, wherein the light path synthesizing means has a polarization plane, and the projection light generated by the first light modulating means and having a first polarization direction passes through the polarization plane, and the projection light generated by the second light modulating means and having a second polarization direction perpendicular to the first polarization direction is reflected by the polarization plane; and beam shifting means which sets beams of the projection lights synthesized by the light path synthesizing means, in a shifted state or a non-shifted state on the basis of the directions of polarizations of the projection lights, the beam shifting means switching the shifted state and the non-shifted state synchronously with modulation timings for the first and second light modulating means.

21. A light modulating unit which modulates an illumination light on the basis of an inputted video signal, the light modulating unit comprising:

at least one light modulating means which modulates an illumination light on the basis of a video signal to generate a projection light that is a linearly polarized light; and beam shifting means which sets a beam of the projection light generated by the light modulating means, in a shifted state or a non-shifted state on the basis of a direction of polarization of the projection light, the beam shifting means switching the shifted state and the non-shifted state synchronously with a modulation timing for the light modulating means, wherein if an amount of input image information contained in the video signal is larger than an amount of display image information which can be displayed by the light modulating means, the beam shifting means sequentially sets the beam of the projection light in the shifted state and the non-shifted state, and if the amount of input image information is smaller than the amount of display image information, the beam shifting means does not sequentially set the beam of the projection light in the shifted state and the non-shifted state but fixes the beam in one state.

\* \* \* \* \*